(12) United States Patent
Sylvain et al.

(10) Patent No.: US 7,996,566 B1
(45) Date of Patent: Aug. 9, 2011

(54) MEDIA SHARING

(75) Inventors: Dany Sylvain, Gatineau (CA); Danny Lingman, Nepean (CA)

(73) Assignee: Genband US LLC, Plano, TX (US)

( * ) Notice: Subject to any disclaimer, the term of this patent is extended or adjusted under 35 U.S.C. 154(b) by 119 days.

(21) Appl. No.: 12/343,328

(22) Filed: Dec. 23, 2008

(51) Int. Cl.
*G06F 15/16* (2006.01)

(52) U.S. Cl. ........ 709/248; 709/202; 709/203; 709/213; 709/217; 709/229; 715/201; 715/205; 715/206; 715/207; 715/208

(58) Field of Classification Search .................. 709/202, 709/203, 213, 217, 229, 248; 715/201, 205, 715/206, 207, 208
See application file for complete search history.

(56) References Cited

U.S. PATENT DOCUMENTS

| | | | |
|---|---|---|---|
| 2003/0006911 A1* | 1/2003 | Smith et al. | 340/988 |
| 2003/0030752 A1* | 2/2003 | Begeja et al. | 348/563 |
| 2003/0041108 A1* | 2/2003 | Henrick et al. | 709/205 |
| 2007/0030824 A1* | 2/2007 | Ribaudo et al. | 370/328 |
| 2008/0034040 A1* | 2/2008 | Wherry et al. | 709/204 |
| 2008/0127289 A1* | 5/2008 | Julia et al. | 725/109 |
| 2008/0178242 A1* | 7/2008 | Eyal et al. | 725/115 |
| 2009/0199230 A1* | 8/2009 | Kumar et al. | 725/32 |

* cited by examiner

*Primary Examiner* — Michael Won
(74) *Attorney, Agent, or Firm* — Jenkins, Wilson, Taylor & Hunt, P.A.

(57) ABSTRACT

The present invention allows multiple participants to share streaming media in an efficient and effective manner, where with select embodiments, playback and playback control of the streaming media may be synchronized among the participants.

32 Claims, 17 Drawing Sheets

MEDIA SHARING

FIELD OF THE DISCLOSURE

The present invention relates to media sharing and in particular to allowing multiple participants to share streaming media in an efficient and effective manner.

BACKGROUND

Media sharing services allow users to publish and access all types of media, including pictures, music, and videos with others via the Internet. These services may be private or public in nature and be open to any number of users. Pictures, songs, and video clips may be uploaded to a media sharing service, which will make the media available to others. YouTube is currently a popular video sharing service, which allows users to search the volumes of published video clips, select video clips of interest, and view the selected video clips. For a given video clip, users may also post written comments, which are viewable by other users. The users are able to communicate with each other as a group by posting and responding to each other's comments. Since the users generally view the video clips and the comments at different times, the communications relating to the video clip generally are not provided in real time, and thus, provide at a best a rudimentary mechanism to allow a group of users to communicate with each other in association with viewing the video clip.

When a user identifies a video clip of interest and wants to inform another user or particular group of users of the video clip, a link to the video clip may be sent to other users through email, messaging services, and the like. Upon receipt of the message, the each user can select the link to gain access to, view, and comment on the associated video clip. Again, the viewing of the video clip and any comments posted for the video clip are not provided in real time. Given the popularity of media sharing, it is becoming more common for users to coordinate the sharing of video clips and other media such that the users establish a time when they will share video clips or other media. Instead of relying on posting and reviewing comments to facilitate communications, the users are establishing a voice or messaging session with one another while they are viewing video clips or other media items. To enhance a group sharing experience, it is preferable to synchronize the presentation of the video clips or other media to the respective users.

Unfortunately, the retrieval and control of video clips or other media is not automatically synchronized and is solely dependent on the individual users. As such, the media being provided to the users at any given time is not synchronized, and extensive efforts are required by the users to ensure that everyone is viewing or listening to roughly the same portion of the desired media. This lack of synchronization is particularly problematic for streaming media. Even if the users successfully coordinate initiation of the streaming media, network and processing delays will vary from one user to the next and cause the different media streams to become substantially misaligned. Since each user can individually control playback of the media stream, if one user elects to stop, pause, rewind, or advance the playback of the media stream, significant efforts are required to re-synchronize playback for different users of the group.

Given the increasing desire for users to share media in real time as a group, there is a need for efficient and effective techniques to organize such media sharing sessions, and allow users to readily join organized media sharing sessions, as well as synchronize playback and control of playback for such media sharing sessions.

SUMMARY OF THE DETAILED DESCRIPTION

The present invention allows multiple participants to share streaming media in an efficient and effective manner, where with select embodiments, playback and playback control of the streaming media may be synchronized among the participants. In one embodiment, a host participant will interact with a live media sharing server (MSS) to select media to be shared with other participants during a subsequent media sharing session. The streaming media is typically either audio or video that has an audio component. Once the media is selected, a uniform resource locator (URL) is assigned to the media sharing session for the selected media by the MSS, and sent to the various participants. The URL may be sent to the participants in an electronic invite message along with various other information, such as but not limited to a description of the media, the time and date for the media sharing session, comments by the host participant, and the like. Once the participants have access to the URL through the invite message or other means, each of the participants can select the URL at or near a designated time to initiate the media sharing session for the selected media. Selection of the URL by each participant results in a message being sent to the MSS. The MSS will determine that the URL has been selected based on the message and instruct an appropriate video server to begin streaming the selected media to a media player running on a user terminal of that participant.

After one or more participants join the media sharing session, the video server will begin streaming a number of media streams for the selected media to the media players of the multiple participants. The MSS will interact with the media players to substantially synchronize playback of the selected media at each of the media players, such that each participant is presented substantially the same portion of the selected media at substantially the same time. Further, the MSS will coordinate playback control among the media players, such that a control input provided by one participant is detected by the MSS and sent to the media players of the other participants for processing. As such, the selected media at the different media players may be played, stopped, paused, advanced, reversed, scrubbed, and the like in a substantially synchronized fashion with the aid of the MSS.

For a participant who joins the media sharing session late, the MSS can track the portion of the selected media that is being synchronously provided to the other participants along with the current playback state. The MSS will instruct the media player of the late joining participant to begin playback of the selected media at the proper portion of the selected media that is being synchronously provided to the other participants in accordance with the current playback state. As such, if the media sharing session is currently paused at a given location in the selected media, the media player of the late joining participant is instructed to display the portion of the selected media at the given location and assume a paused playback state. If the selected media in the media sharing session is being actively played back, the media player of the late joining participant is instructed to start active playback such that the portion of the selected media provided by the media player of the late joining participant is substantially the same as that of the other media players in the media sharing session.

In association with establishing and controlling the media sharing session, the MSS may also assist in establishing and controlling an associated communication session among the participants in the media sharing session. The communication session allows the participants to communicate with each other in real time via their respective communication clients during the media sharing session. The communication session may include, but is not limited to, one or more of the following: voice, video, email, text messaging, multimedia messaging, instant messaging, or like sessions. A communication session may be established directly between the communication clients of the participants or with a conference bridge or messaging service to facilitate communications among any number of conference participants. Selection of the URL to initiate the media sharing session may also trigger initiation of one or more communication sessions that are associated with the media sharing session.

Thus in one embodiment, the various participants may select the URL that is provided in an invite to join a communication session with the other participants as well as initiate streaming of the selected media for the media sharing session. The MSS will control the media players of the participants such that playback and playback control of the selected media are substantially synchronized among the different media players. The participants may communicate with each other in real time over the communication session while being presented the selected media for the media sharing session.

Those skilled in the art will appreciate the scope of the present invention and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

Figure 1:
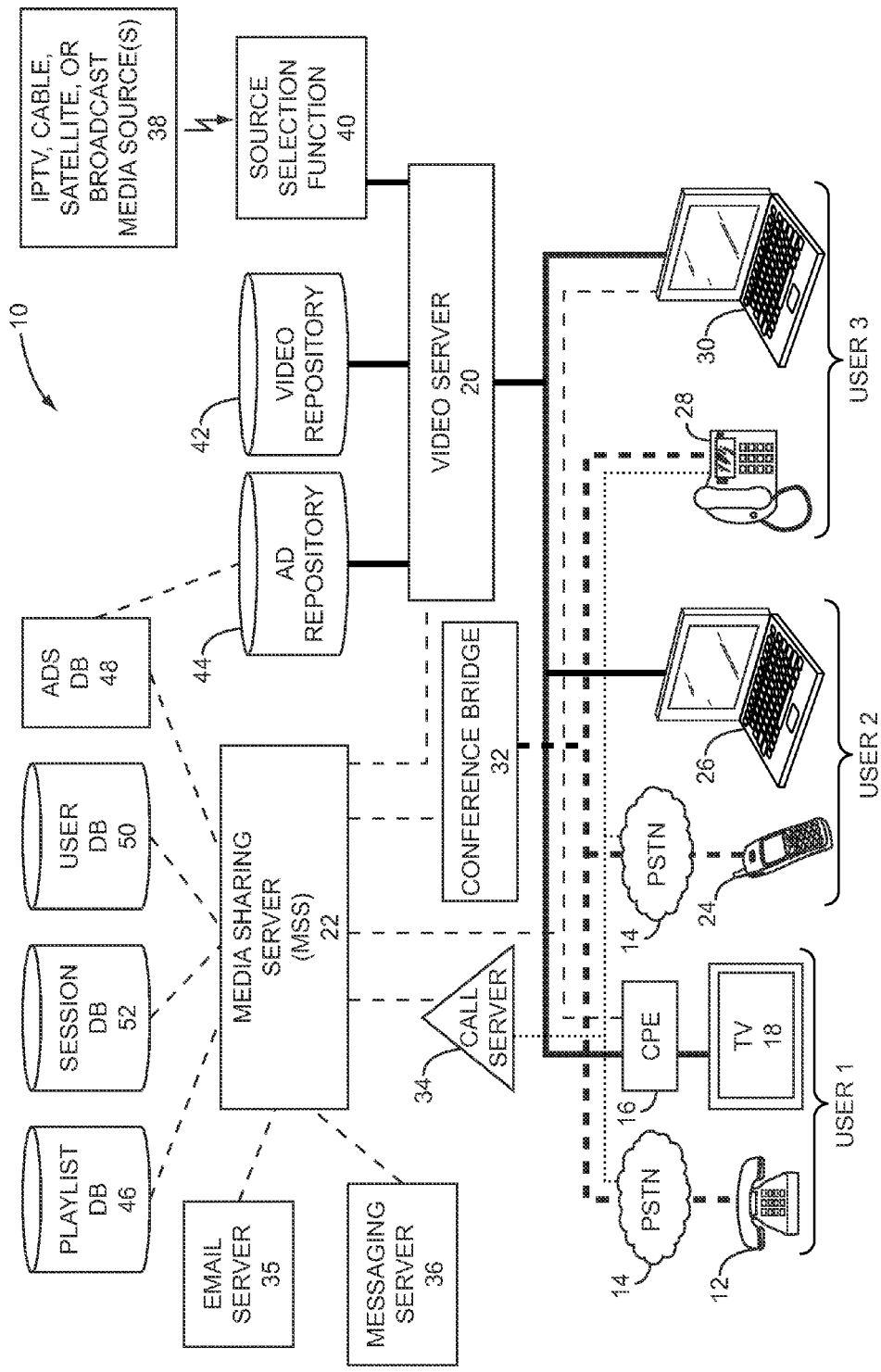
FIG. 1 is a block representation of a communication environment according to one embodiment of the present invention.

Prior to delving into the details of the present invention, an overview is provided of an exemplary communication environment 10 in which certain embodiments of the present invention may be employed, as illustrated in FIG. 1. As depicted, a number of users are associated with various equipment, which may be configured to receive media streams, support communications, or both. As shown in FIG. 1, User 1 is associated with a Plain Old Telephone System (POTS) telephone 12, which is served by the Public Switched Telephone Network (PSTN) 14. Through the POTS telephone 12 and the PSTN 14, User 1 may participate in a voice-based communication session with other users, including User 2 and User 3. User 1 is also associated with customer premise equipment (CPE) 16, which is connected to a television (TV) 18. The CPE 16 may receive service via an appropriate cable, satellite, or Internet Protocol television (IPTV) service through an appropriate network (not shown). Preferably, the CPE 16, in addition to providing normal television services, is capable of receiving streaming media, such as audio and video media, from a video server 20. The CPE 16 may provide a media player or like functionality to receive the streaming media from the video server 20 and facilitate playback of the media provided in the streaming media to User 1 via the television 18. As will be described in further detail below, the CPE 16 may also include a browser or like functionality to facilitate interaction with a media sharing server (MSS) 22, which will be described in detail further below. The MSS allows multiple participants to share streaming media in a synchronized fashion.

User 2 is associated with a mobile terminal 24 and a personal computer 26. The mobile terminal 24 is served by a cellular and PSTN 14 connection, and the personal computer 26 is served by a local area network, which is not shown, and provides access to the Internet, which facilitates interaction with the MSS 22 as well as provides a mechanism for receiving streaming media from the video server 20. User 3 is associated with a voice-over-Internet Protocol (VoIP) telephone 28 and a personal computer 30. As with User 2, the personal computer 30 is connected to the Internet, which provides connectivity to the MSS 22 and the video server 20. The mobile terminal 24 of User 2 and the VoIP telephone 28 of User 3 may be used to facilitate voice or text based communications with other participants in a media sharing session. The personal computers 26, 30 may include browsers and media players to facilitate interactions with appropriate web servers as well as receive and facilitate playback of the media from streaming media that is received from the video server 20.

As such, each of the users 1, 2, and 3 has access to a media player or the effective functionality thereof via the respective CPE 16, personal computer 26, and personal computer 30. Further, each of the users 1, 2, and 3 can support voice communications via the respective POTS telephone 12, mobile terminal 24, and VoIP telephone 28. Any two or more of the users 1, 2, 3 may participate in a communication session with one another using the respective POTS telephone 12, mobile terminal 24, and VoIP telephone 28, directly or via a conference bridge 32. If the conference bridge 32 is employed for a communication session, each of the users 1, 2, and 3 will establish individual voice sessions with the conference bridge 32 via the respective POTS telephone 12, mobile terminal 24, and VoIP telephone 28, and the conference bridge 32 will effectively join the individual voice sessions to provide a conference session, which will allow the various users 1, 2, and 3 to talk to one another in traditional conference fashion. As will be described in further detail below, the conference bridge 32 may also interact with and be controlled by the MSS 22 as well as a call server 34.

The call server 34 may be employed to initiate the individual voice sessions between the conference bridge 32 and the respective POTS telephone 12, mobile terminal 24, and VoIP telephone 28 using existing third party call control techniques. If the conference bridge 32 is not employed, the call server 34 may be used to initiate individual voice sessions between any two or more of the POTS telephone 12, mobile terminal 24, and VoIP telephone 28 of the respective users 1, 2, and 3. In operation, the MSS 22 may instruct the call server 34 to establish individual voice sessions with the conference bridge 32 or between any two or more of the users 1, 2, and 3 via the POTS telephone 12, mobile terminal 24, VoIP telephone 28, or other appropriate communication terminal. Notably, communication clients may be provided on the personal computers 26, 30 or other like devices such that voice based communications may be supported through the same or different terminals that are used to receive and facilitate playback of streaming media.

In addition to facilitating voice communications between the users 1, 2, and 3, messaging sessions may be supported among the various users 1, 2, and 3. Such messaging may include, but is not limited to, email, instant messaging (IM), text messaging, and multimedia messaging. As illustrated, an email server 35 may be employed to facilitate the exchange of emails among the various users 1, 2, and 3, and in particular between the personal computers 26, 30 and perhaps the CPE 16. Messaging may be facilitated by a messaging server 36. These devices may include communication clients, and in particular messaging clients, to facilitate the exchange of messaging via the email server 35 and the messaging server 36. Again, the email server 35 and the messaging server 36 may be controlled, at least in part, by the MSS 22.

As indicated, the present invention allows multiple participants to share streaming media, preferably where playback and playback control of the streaming media is synchronized among the participants. The streaming media is streamed to the media players of the participants from the video server 20. In the illustrated example of FIG. 1, the media players or equivalent functionality is provided in the CPE 16, personal computer 26, and personal computer 30 of the respective users 1, 2, and 3, which represent the participants in a media sharing session. The streaming media may include audio and video content, which corresponds to various types of programming that may or may not include advertising content. The streaming media may be obtained from IPTV, satellite, or broadcast media sources 38, wherein the streaming media is selectively retrieved via an appropriate source selection function 40, which may effectively tune to an appropriate channel or download specific media based on instructions from the video server 20. Media may also be obtained from appropriate repositories, such as a video repository 42 or an ad repository 44. The video repository 42 may include libraries of audio or video files from which the video server 20 may retrieve media for streaming to the various media players of the participants in the media sharing session. The video repository 42 may also include content that was uploaded by a participant. Similarly, audio or video based ad content may be provided in the ad repository 44, and obtained by the video server 20 for streaming to the media players of the participants. Notably, the video server 20 may be instructed to obtain various program and advertising content and combine the program and advertising content as desired prior to streaming the combined media to the media players of the participants. The advertisements may be provided between or within designated programs or program segments, such that the media being streamed to the participants appears as a single contiguous stream. Alternatively, various segments may be streamed in association with instructions for the media players to effectively assemble the different segments into a contiguous stream that is presented to the participants.

As indicated, the media provided to the participants by the video server 20 may be broken into various segments, which may correspond to programming, portions of programming, advertisements, and the like. The different segments may come from the same or different sources and may be assembled into a single stream by the video server 20 or at the media players of the respective participants. For a media sharing session, the MSS 22 will effectively provide sufficient instructions to the video server 20 to retrieve the desired media and stream the media toward the media players of the respective participants.

The MSS 22 may have access to a playlist database (DB) 46, which provides an index of the media that is available for streaming to the various participants. For example, the playlist database 46 may include an index of the audio and video content provided in the video repository 42, the advertisements available in the ad repository 44, and a schedule of the content being made available by the IPTV, cable, satellite, or broadcast media sources 38. Accordingly, the information provided by the playlist database 46 may allow the MSS 22 to provide information to the various participants so they may select desired media, as well as once desired media has been selected, instruct the video server 20 to stream the selected media to the various participants at a desired time or in a desired fashion. Those skilled in the art will recognize that the indexing of the playlist database 46 may be provided in different databases and configured in virtually any manner. For example, the playlist database 46 may only include an index for available programming content, wherein a separate ads database 48 may be provided to keep track of available advertisements that are stored in the ad repository 44. The ads database 48 may also be used to control the advertising content provided in the ad repository 44, and thus made available to the video server 20.

Finally, a user database 50 and a session database 52 may be made available to the MSS 22 to keep track of available participants and information pertaining to past, present, or future media sharing sessions, respectively.

The present invention allows multiple participants to share streaming media in an efficient and effective manner, where with select embodiments, playback and playback control of the streaming media may be synchronized among the participants. In one embodiment, a host participant will interact with the MSS 12 to select media to be shared with other participants during a subsequent media sharing session. Assume that users 1, 2, and 3 are participants and that User 3 is the host participant. In the following example, the streaming media to be shared is either audio or video that has an audio component. Once the media is selected, a uniform resource locator (URL) is assigned to the media sharing session for the selected media by the MSS 12, and sent to the various participants. The URL may be sent to the participants in an electronic invite message along with various other information, such as but not limited to a description of the media, the time and date for the media sharing session, comments by the host participant, and the like. Once the participants have access to the URL through the invite message or other means, each of the participants can select the URL at or near a designated time to initiate the media sharing session for the selected media. Selection of the URL by each participant results in a message being sent to the MSS 22, which instructs the video server 20 to begin streaming the selected media to a media player running on a user terminal, such as the CPE 16, personal computer 26, and personal computer 30, of that participant. Assume that the term "media player" when used in context of the CPE 16 refers to the functionality provided by the CPE 16 to receive, process, and present the media being streamed by the video server 20.

After multiple participants join the media sharing session, the video server 20 will begin streaming a number of media streams for the selected media to the media players of the multiple participants. The MSS 22 will interact with the media players to substantially synchronize playback of the selected media at each of the media players, such that each participant is presented substantially the same portion of the selected media at substantially the same time. Further, the MSS 22 will coordinate playback control among the media players, such that a control input provided by one participant is detected by the MSS 22 and sent to the media players of the other participants for processing. As such, the selected media at the different media players may be played, stopped, paused, advanced, reversed, scrubbed, and the like in a substantially synchronized fashion with the aid of the MSS 22.

For a participant who joins the media sharing session late, the MSS 22 can track the portion of the selected media that is being synchronously provided to the other participants along with the current playback state. The MSS 22 will instruct the media player of the late joining participant to begin playback of the selected media at the proper portion of the selected media that is being synchronously provided to the other participants in accordance with the current playback state. As such, if the media sharing session is currently paused at a given location in the selected media, the media player of the late joining participant is instructed to display the portion of the selected media at the given location and assume a paused playback state. If the selected media in the media sharing session is being actively played back, the media player of the late joining participant is instructed to start active playback such that the portion of the selected media provided by the media player of the late joining participant is substantially the same as that of the other media players in the media sharing session.

In association with establishing and controlling the media sharing session, the MSS 22 may also assist in establishing and controlling an associated communication session among the participants in the media sharing session. The communication session allows the participants to communicate with each other in real time via their respective communication clients during the media sharing session. The communication session may include, but is not limited to, one or more of the following: voice, video, email, text messaging, multimedia messaging, instant messaging, or like sessions. A communication session may be established directly between the communication clients of the participants or with the conference bridge 32, email server 35, or messaging server 36 to facilitate communications among any number of conference participants. The communication clients may represent any terminal that is capable of supporting the type of communication session being employed. For example, a communication client for voice sessions may represent a separate telephony terminal, such as the POTS telephone 12, mobile terminal 24, or VoIP telephone 28, or a function provided by the CPE 16 or personal computers 26, 30 that is capable of supporting a bi-directional voice session. Selection of the URL to initiate the media sharing session may also trigger initiation of one or more communication sessions that are associated with the media sharing session.

Thus in one embodiment, the various participants may select the URL that is provided in an invite to join a communication session with the other participants as well as initiate streaming of the selected media for the media sharing session. The MSS 22 will control the media players of the participants such that playback and playback control of the selected media are substantially synchronized among the different media players. The participants may communicate with each other in real time over the communication session while being presented the selected media from the media sharing session.

Figure 2A:
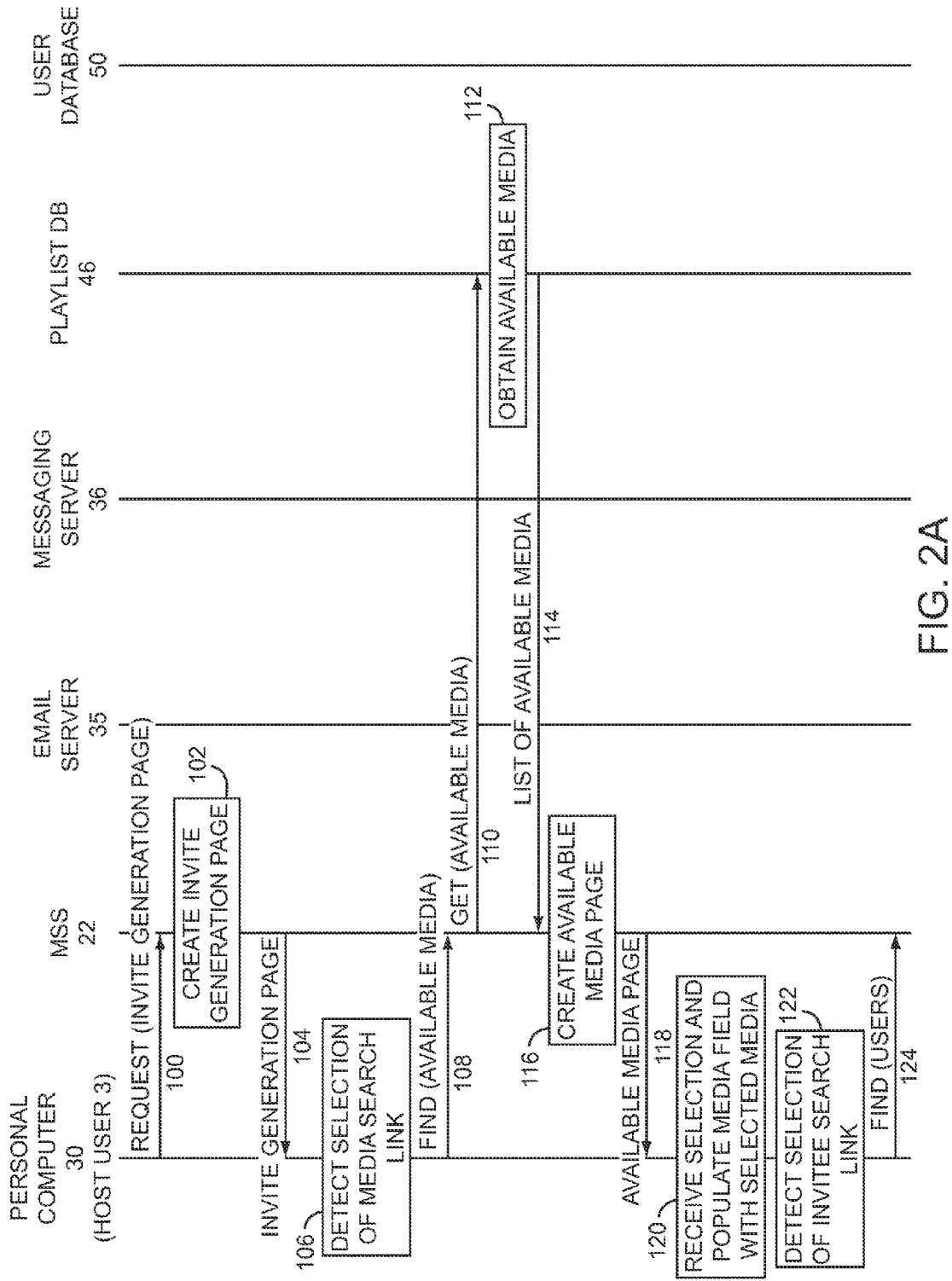
FIGS. 2A and 2B provide a message flow illustrating an exemplary process for creating an invite according to one embodiment of the present invention.
Figure 2B:
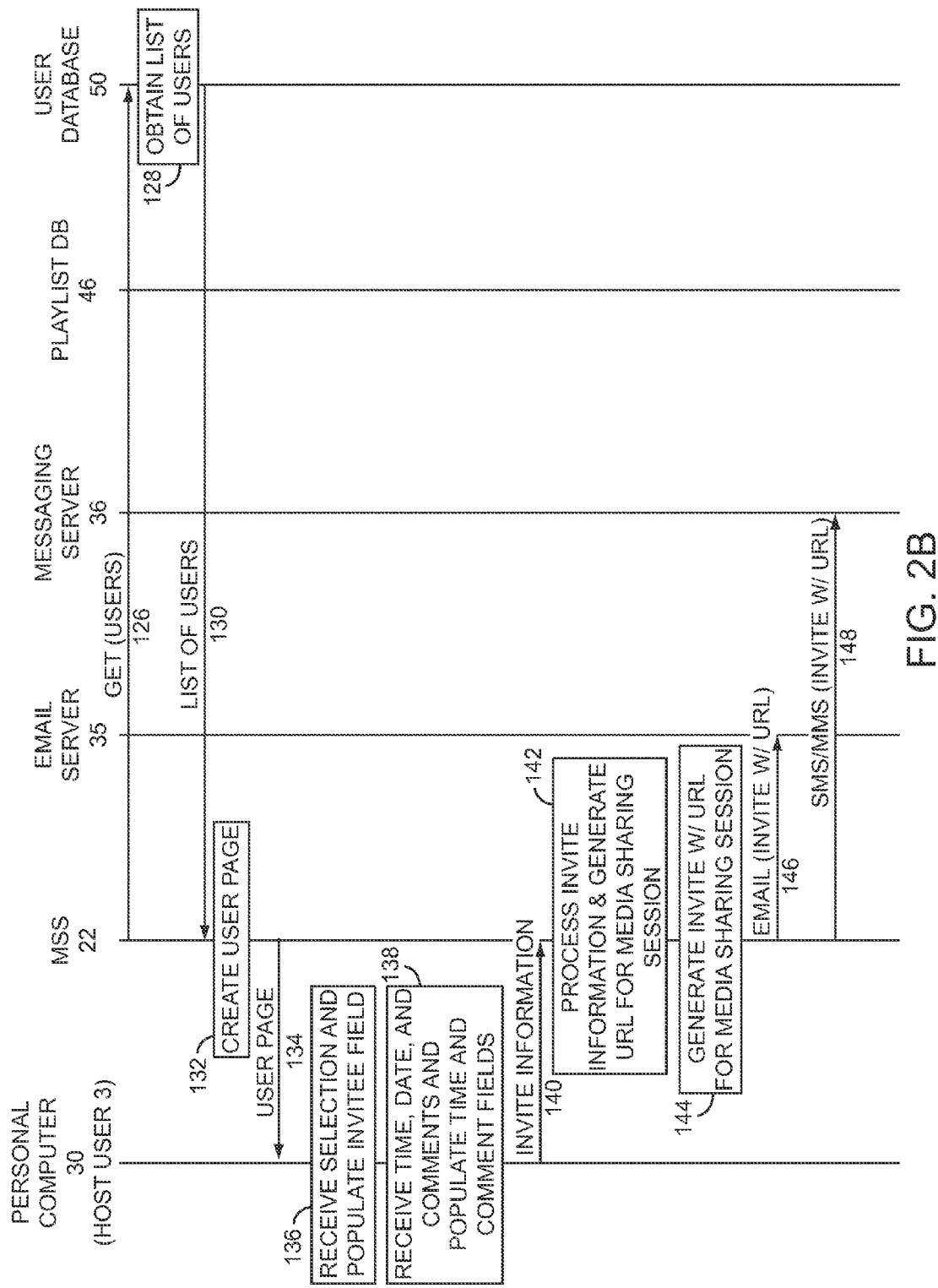

With reference to FIGS. 2A and 2B, a message flow is provided to illustrate creation of an invite according to one embodiment of the present invention. As indicated above, assume User 3 is the host participant and will interact with the MSS 22 via their personal computer 30 to generate an invite for a media sharing session. Although any interface is available, assume the personal computer 30 provides a browser and the MSS 22 provides a web server function, such that the user may create the invite using the browser and the MSS 22 can interact with the browser through the web server function. Assume that User 3 opens up the web browser in the personal computer 30 and instructs the browser to send a request to obtain the invite generation page, which is used to generate an invite, from the MSS 22 (step 100). The MSS 22 will create an invite generation page in response to the request (step 102) and provide the invite generation page to the browser of the personal computer 30 (step 104). The invite generation page will then be displayed to User 3. Preferably, the invite generation page is configured to facilitate generation of the invite based on input by the host participant.

Figure 3:
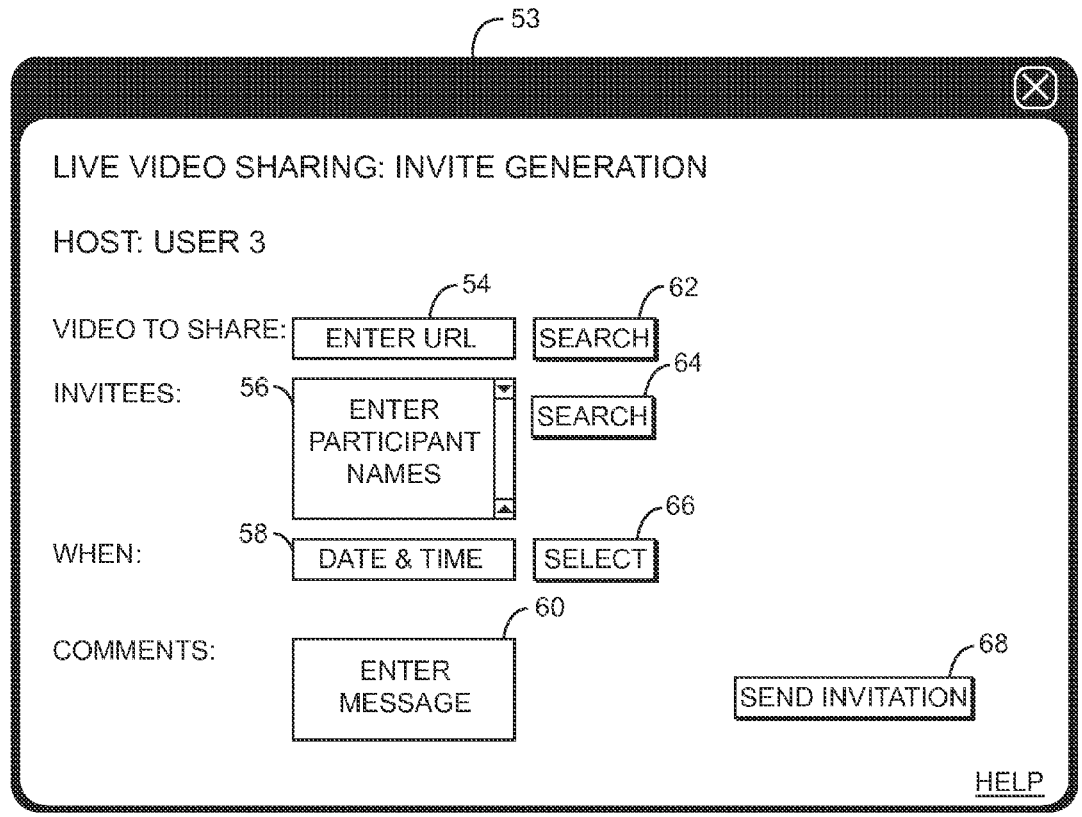
FIGS. 3 through 6 illustrate an invite generation page and the sequential filling out of various fields in the invite generation page according to one embodiment of the present invention.

An exemplary invite generation page 53 is illustrated in FIG. 3 as it is displayed by the browser. The invite generation page 53 may include fields in which the host participant can enter information, as well as links to trigger various actions. As depicted, the invite generation page 53 includes a media field 54, an invitees field 56, a time field 58, and a comments field 60. As depicted, the media to be shared is identified in the media field 54, and in this particular embodiment the media is assumed to be video. The particular video may be identified by an appropriate URL that is entered into the media field 54. Alternatively, a media search link 62 may be selected by the host participant to retrieve another web page or open a new window that will allow the participant to identify the available media for streaming. Upon selection of the media search link 62, a request may be sent to the MSS 22, which may access the playlist database 46 or the like to effectively allow the host participant to browse through the available media and select the media for streaming. The media for streaming may include one or more programs, program segments, advertisements, and the like. The advertisements may be automatically selected by the MSS 22, preferably using information about the participants such that the advertising is targeted to the participants. Further, the MSS 22 may interact with the ads database 48 to determine where the ads should be inserted within the media selected by the host participant. The selected program content may have advertising tags associated with it, wherein the tags are used to identify advertising slots in the program content. The MSS 22 may, as described further below, provide instructions to the video server 20 to allow the appropriate ads to be inserted into the selected program content at the appropriate times while the program content is being streamed to the media players of the various participants.

In addition to directly entering the desired media and searching for desired media through interaction with the MSS 22, the host participant may access program guides and playlists provided by virtually any entity, with or without the assistance of the MSS 22. Depending on the source, the media content may include live television from IPTV, cable, satellite or broadcast media sources 38, video-on-demand content, content recorded on network personal video recorders, media files stored in the video or ad repositories 42, 44, or media uploaded by the host participant or other participants to the video server 20 or an entity accessible by the video server 20.

Continuing with the message flow of FIGS. 2A and 2B, assume the host participant elects to select the media search link 62 to obtain a list of the available media items that may be selected for streaming during the media sharing session. Upon being selected, the personal computer 30 will detect the selection of the media search link 62 (step 106) and send a message instructing the MSS 22 to find the available media (step 108). The MSS 22 may access the playlist database 46 to identify the available media, and in particular, may send a GET message to the playlist database 46 to identify the media that is available to the participant for the media sharing session (step 110). The playlist database 46 will obtain the available media (step 112) and provide a list of the available media, including any necessary identifiers or URLs for the available media, back to the MSS 22 (step 114). Based on the list of available media provided by the playlist database 46, the MSS 22 may create an available media page (step 116) and present the available media page to the personal computer 30 (step 118). The personal computer 30 may display the available media page to the host participant in a window separate from that in which the invite generation page is being displayed. The host participant may browse through the list of available media that is provided in the available media page, and select one or more media items from the list of available media for the media sharing session.

Figure 4:
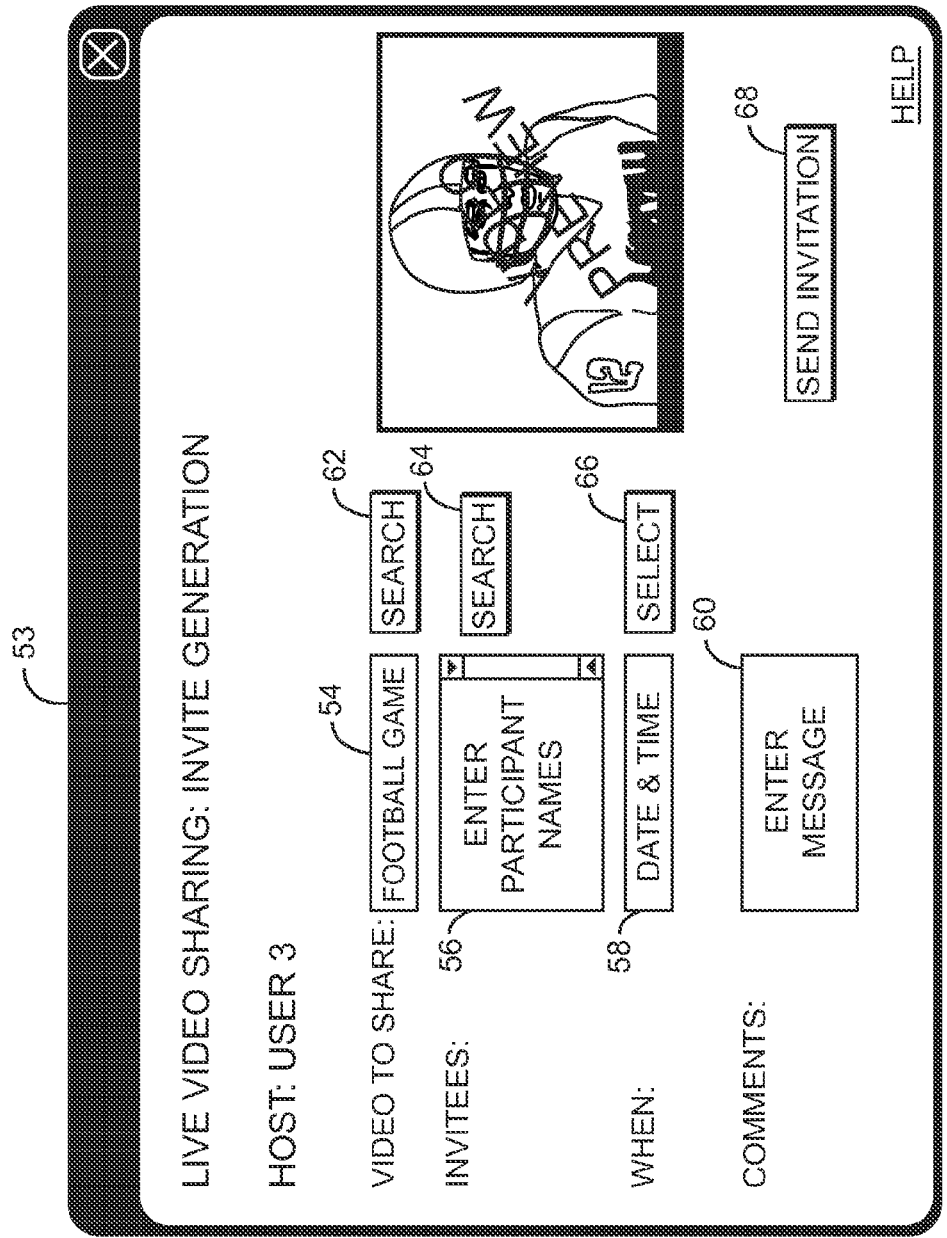

Upon detecting the selection of one or more media items from the available media page, the personal computer 30 may populate the media field 54 of the invite generation page (step 120). For this example, assume the selected media item corresponds to either a live or recorded football game, and that upon selection of the football game, the media field 54 is populated as illustrated in FIG. 4. In association with obtaining information about the football game, text, images, or as shown, a video clip that represents a preview of the football game, may be obtained by the MSS 22 and provided in or with the information pertaining to the football game in the invite generation page 53. Although only a single program is shown as being selected, the media identified for the streaming media session may include any number of media segments that pertain to the same or different programming or advertising content. When multiple media segments are identified, a playlist of the media segments is effectively identified by the host participant and is used to identify the media for the media sharing session.

Next, the host participant may take steps to identify the users to invite to the media sharing session. In this example, assume that selection of an invitee search link 64 will trigger the MSS 22 to obtain and present a list of users representing potential participants to the host participant. Accordingly, the personal computer 30 will detect the host participant's selection of the invitee search link 64 (step 122) and send a FIND message to the MSS 22 to identify those users who are potential participants for a media sharing session with the host participants (step 124). The MSS 22 may generate a GET message, which is sent to the user database 50 to identify those users who are potential participants for the media sharing session (step 126). The user database 50 will obtain a list of users (step 128) and provide the list of users back to the MSS 22 (step 130). The MSS 22 may create a user page (step 132) and provide the user page to the personal computer 30 (step 134). The personal computer 30 may display the user page, which includes a list of users, to the host participant in a separate window.

Figure 5:
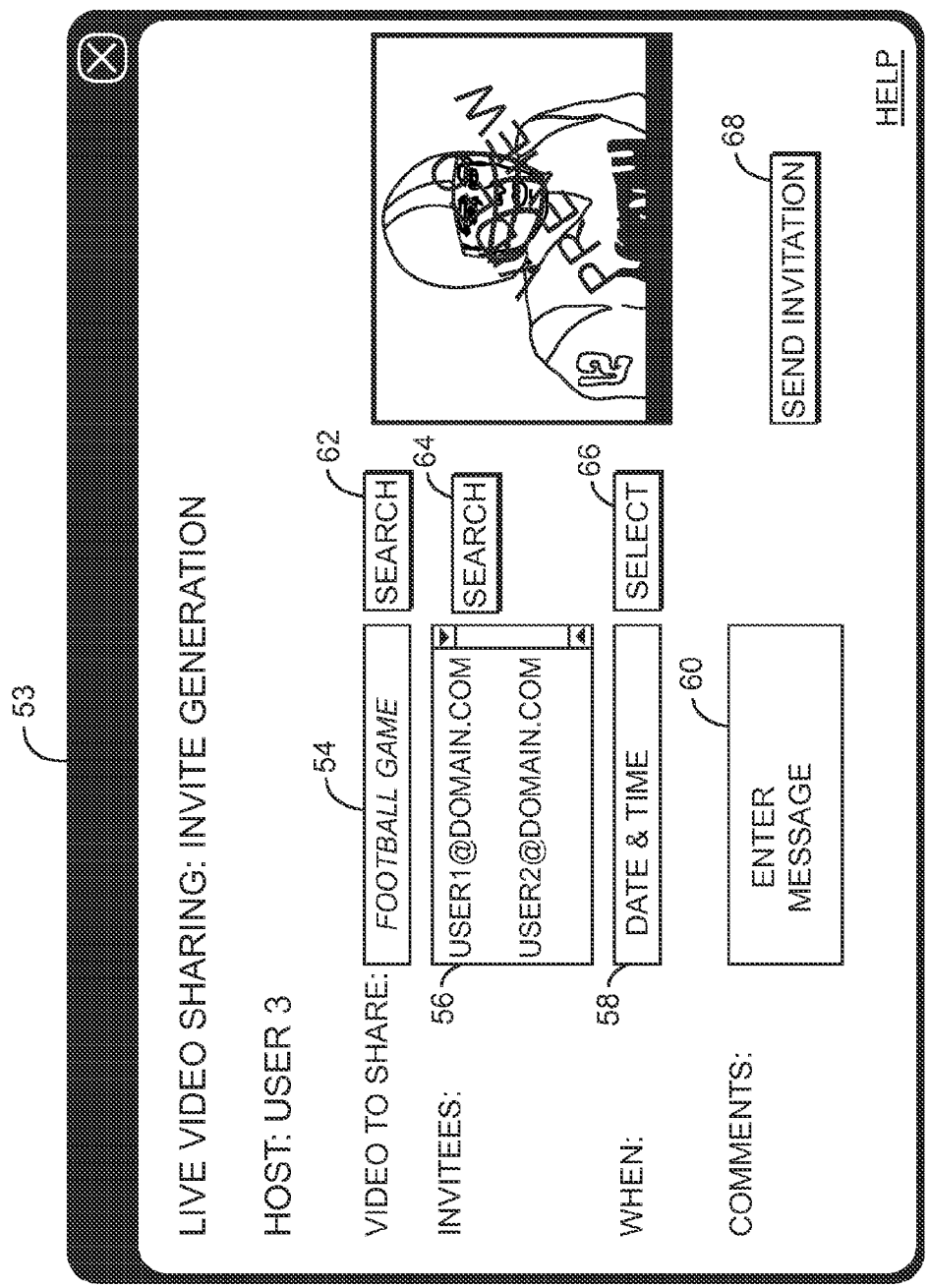

The host participant may select those users from the list of users, and upon receiving such selections, the personal computer 30 will populate the invitee field 56 of the invite generation page with identifiers or communication addresses associated with the selected users (step 136). Notably, the user database 50 may have provided these identifiers and communication addresses with the list of users that is provided to the MSS 22. The MSS 22 may have provided this information in the user page or may maintain it locally. At this point, assume the host participant, which is User 3 in this example, selected users 1 and 2 as participants for the media sharing session. As such, the invitees field 56 is populated with email addresses for users 1 and 2, as illustrated in FIG. 5. These email addresses, which could have been other messaging addresses, will be used by the MSS 22 to send electronic invites to users 1 and 2 via an appropriate email or other messaging client.

Figure 6:
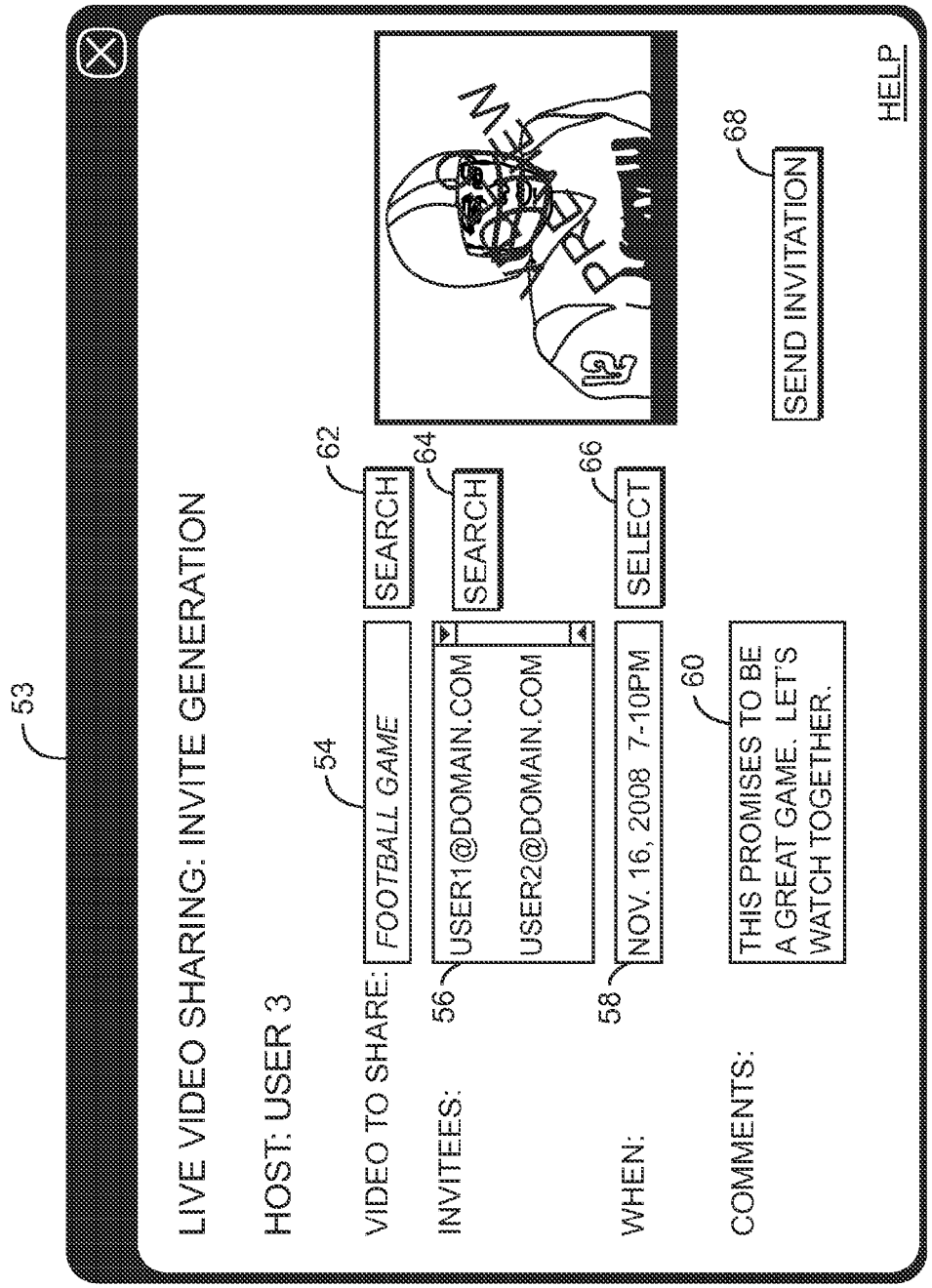

Next, the host participant may populate the time field 58 directly or in response to selecting the time select link 66, which may result in the host participant being presented a calendar from which a time and date may be selected for the media sharing session (step 138). Notably, the time select link 66 may be automatically populated if the selected media is associated with a live or broadcast event that is slated to occur at a specific time. In such situations, the information provided by the playlist database 46 may include scheduling information for such programs, and selection of such a program by the host participant will automatically result in the time field 58 being populated in an appropriate fashion. In addition, the host participant may provide any desired comments in the comments field 60. Based on the time, date, and comment information, the personal computer 30 will populate the time and comments fields 58, 60, perhaps as illustrated in FIG. 6.

Figure 7:
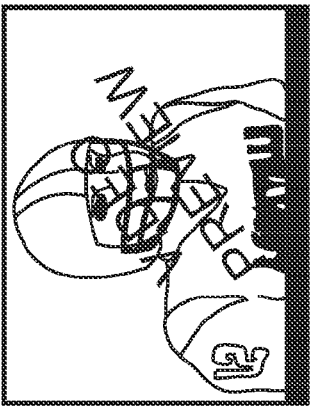
FIG. 7 provides an exemplary invite according to one embodiment of the present invention.

At this point, the media, participants, time, and any desired comments are identified in the invite generation page, and upon selection of the send invitation link 68, the personal computer 30 will send the corresponding invite information to the MSS 22 (step 140), which will process the invite information and generate a URL for the media sharing session (step 142). Next, the MSS 22 will generate an invite with the URL for the media sharing session (step 144) and deliver the invites to the selected participants via the email or messaging servers 35, 36 (steps 146 and 148). Preferably, the invite will include sufficient information to identify the media sharing session, the media being shared, the participants in the media sharing session, the time and date for the media sharing session, the host participant, and any comments provided by the host participant. An exemplary invite 70 is illustrated in FIG. 7. Notably, the URL, which may be represented by a link, is prominently displayed in the invite, and may be the mechanism through which the participants initiate the media sharing session. In addition, text, images, or a video clip that is associated with the media to be shared, and in this instance the football game, may be provided in the invite 70.

Figure 8:
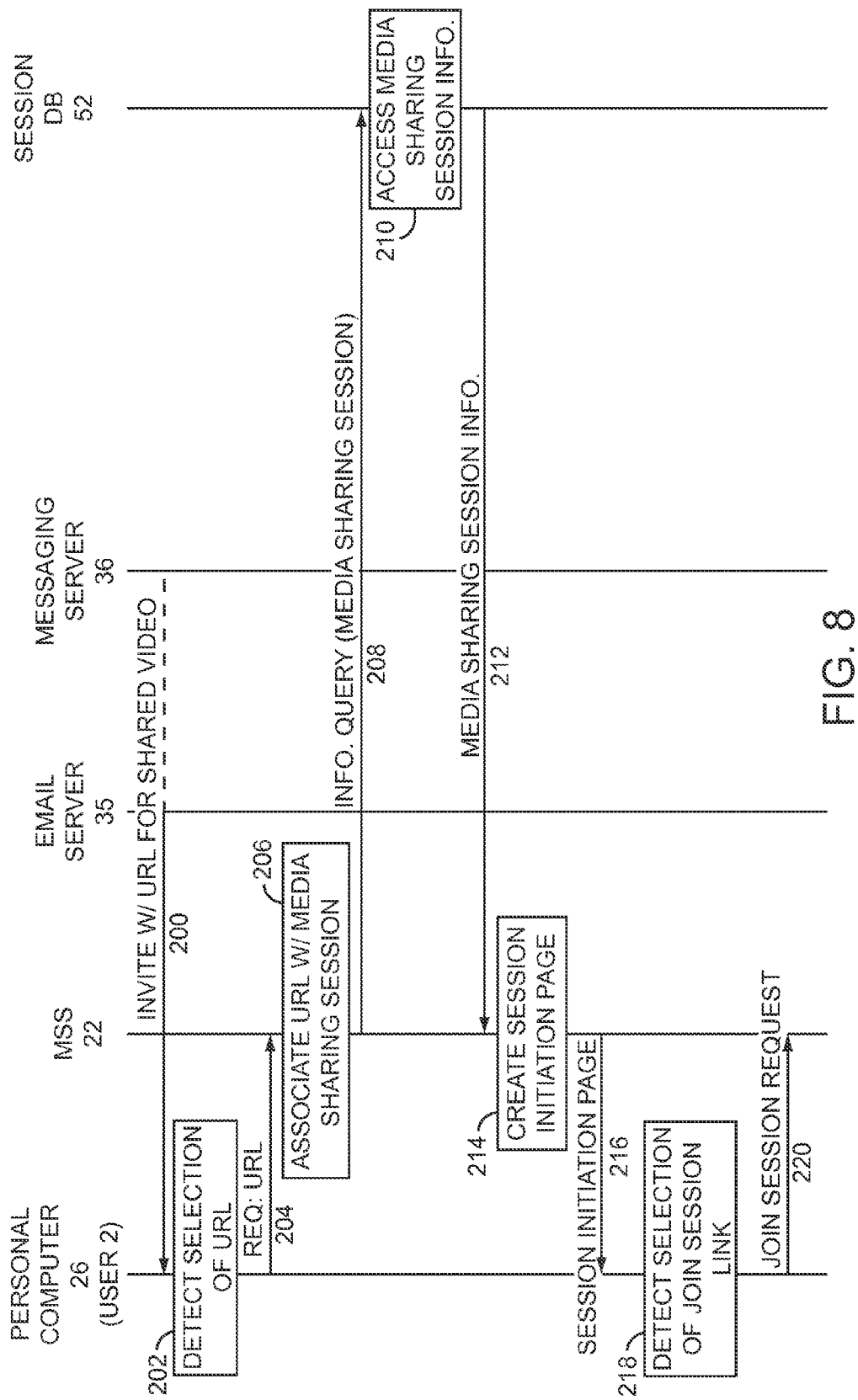
FIG. 8 provides a message flow illustrating an exemplary process for processing a received invite according to one embodiment of the present invention.

The process of receiving an invite 70 and selecting the URL provided in the invite 70 to initiate the media sharing session for a given participant is illustrated in the message flow of FIG. 8, according to one embodiment of the present invention. In this example, assume the message flow is from the perspective of User 2, and that the invite was received by email or text message via the email server 35 or messaging server 36 (step 200). When User 2 decides to join the media sharing session, they may open the invite 70 and select the URL, which again may be represented by a link, provided in the invite 70. The personal computer 26 will detect the selection of the URL (step 202), open a browser, and send a request via the browser to the MSS 22 using the URL (step 204). The MSS 22 will associate the URL with the media sharing session, which was arranged by the host participant (step 206). The information associated with the media sharing session may be stored locally at the MSS 22 or remotely in the session database 52. In this example, assume the media sharing session information for the media sharing session is stored in the session database 52. As such, the MSS 22 may generate an information query for the media sharing session and send the information query to the session database 52 (step 208), which will access the media sharing session information for the media sharing session (step 210) and provide the information back to the MSS 22 (step 212). The media sharing session information will generally include all or a portion of the information from the invite 70. The MSS 22 may create a session initiation page based on the media sharing session information (step 214) and send the session initiation page to the personal computer 26 (step 216), which will display the session initiation page to User 2.

Figure 9:
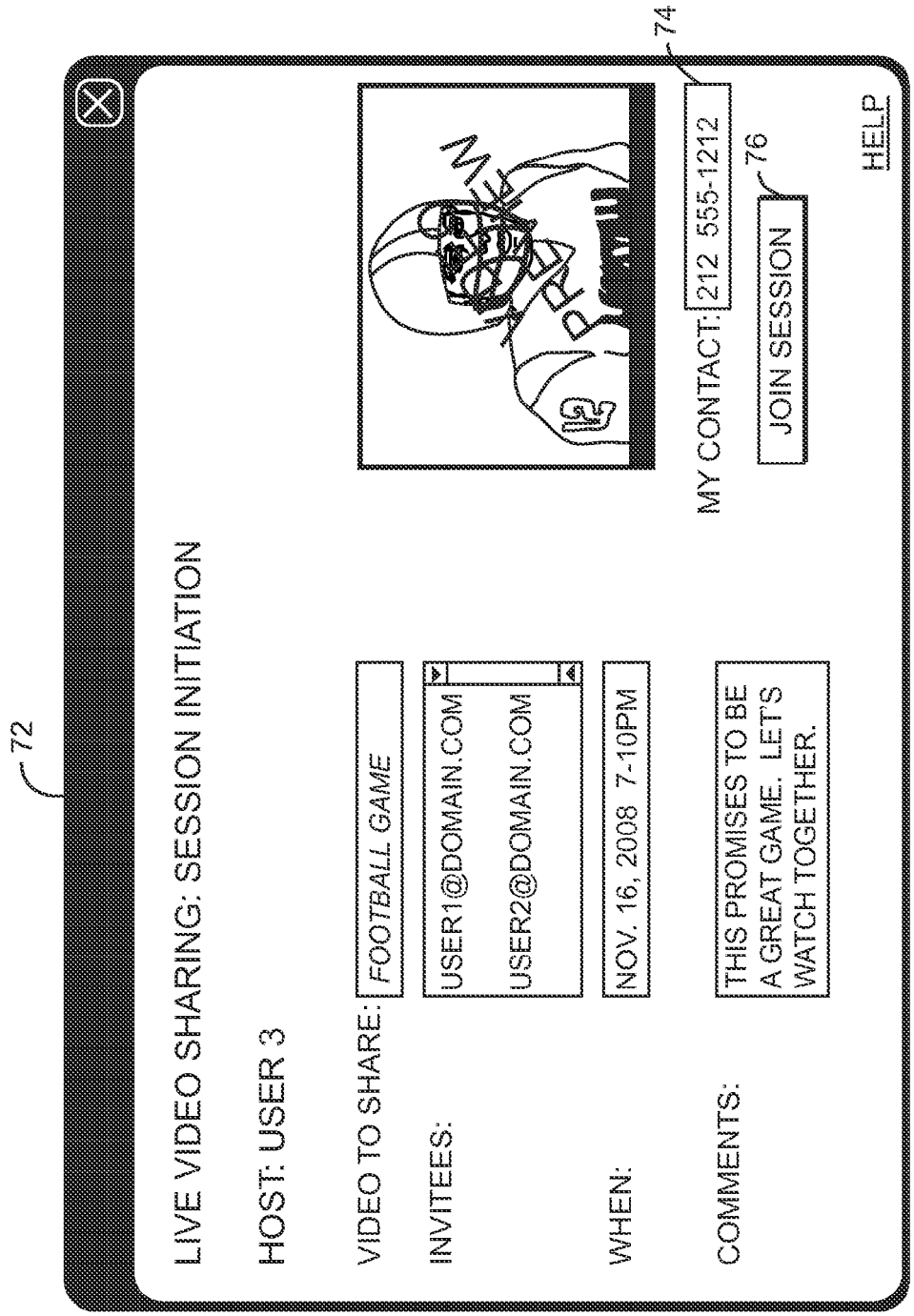
FIG. 9 illustrates a session initiation page according to one embodiment of the present invention.

An exemplary session initiation page 72 is illustrated in FIG. 9. In this example, the session initiation page 72 is generated with a contact field 74, which is preferably populated either by the MSS 22 or the participant with a communication address, such as a directory number, for the communication terminal to use for the communication session that will be established in association with the media sharing session. The contact field 74 may be a communication address for voice or messaging based communications. In this example, the associated communication session is a voice session, and the contact field 74 is populated with a directory number, which represents the directory number of the mobile terminal 24 associated with User 2. The session initiation page 72 may also include any information associated with the invite, as well as a join session link 76. When selected, the join session link 76 will trigger the MSS 22 to initiate both the separate communication session as well as the media sharing session, in this embodiment. In other embodiments, selection of the URL in the invite 70 may trigger the media sharing session, and any separate communication sessions may be established independently therefrom. When User 2 selects the join session link 76, the personal computer 26 will detect the selection of the join session link 76 (step 218) and send a request to join the media sharing session to the MSS 22 (step 220), which will take the necessary steps to either initiate the media sharing session or join the existing media sharing session, depending on the relative timing of User 2 selecting the join session link 76 relative to the other participants attempting to join the media sharing session.

With the above example, the invite 70 was sent by email or other messaging service message to the various participants. Such invites 70 or invite information may be sent using alternative mechanisms or may be published for retrieval by the various participants. The invites 70 may be sent to the various participants through virtually any device that is accessible by the participants. As such, the invites 70 may be sent to the CPE 16 as well as personal computers 26, 30 in virtually any format for users 1, 2, and 3. Further, the identified participants for a media sharing session may be selected individually, from a predefined list, or as part of a social networking group. The time for a media sharing session may be a specified time and date, a recurring time and date, immediately, or as soon as the first participant joins. Further, a participant identified by the host participant may forward an invite 70 or the invite information, and in particular the URL, to other users, who may use the URL or invite information to join the media sharing session. Depending on the desires of the host participant, the media sharing session may be limited to those participants identified by the host participant, or may be open to all who have access to the URL or invite information.

Figure 10:
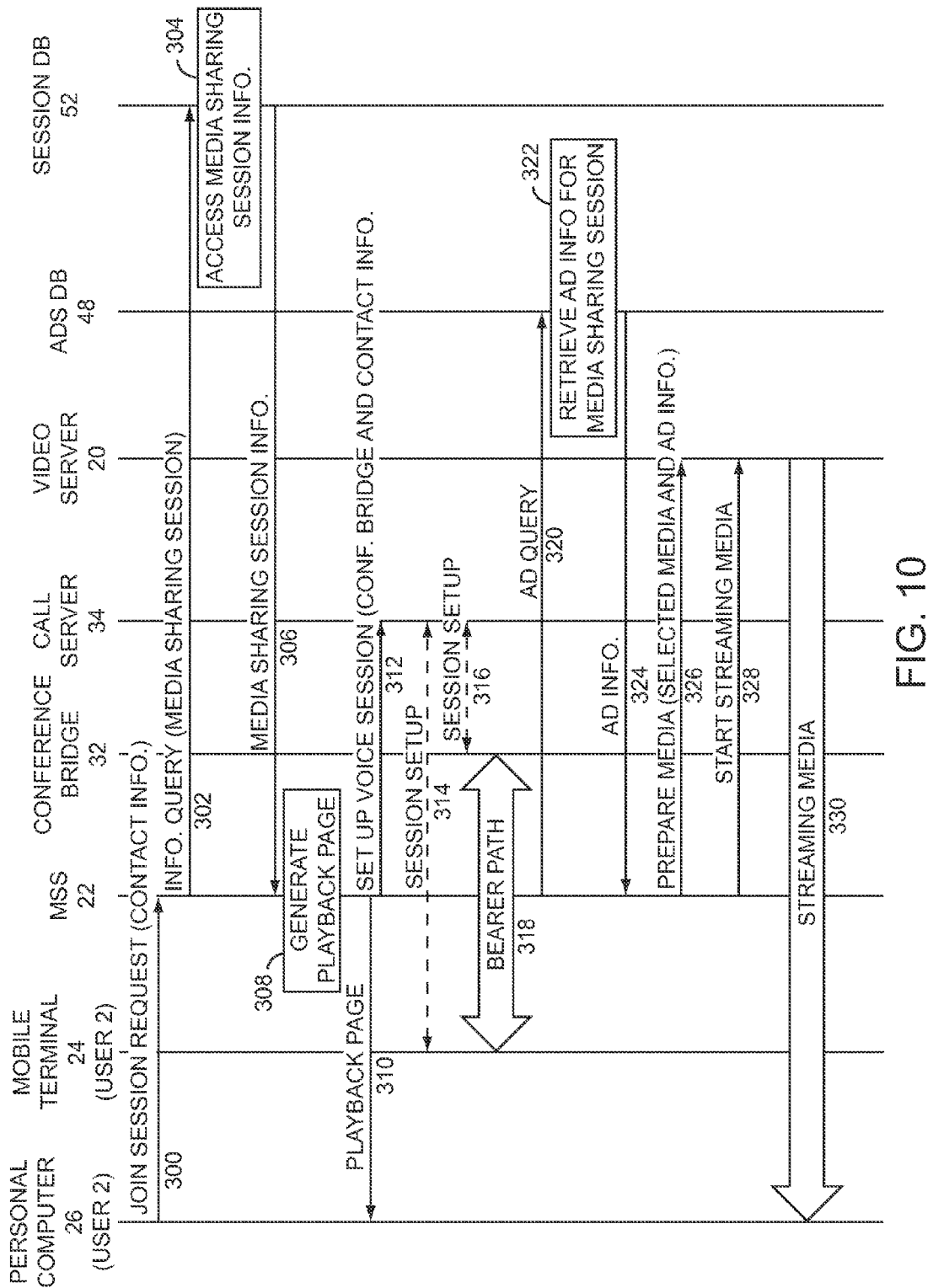
FIG. 10 provides a message flow illustrating an exemplary process for initiating a media sharing session and an associated communication session according to one embodiment of the present invention.

With reference to FIG. 10, a message flow is provided to illustrate initiation of a voice based communication session and the media sharing session in response to a participant, in particular User 2, selecting the join session link 76 from the session initiation page 72. Although illustrated as being initiated from the session initiation page 72, any participant may join the media sharing session, and perhaps the associated communication session, by accessing the MSS 22 with the URL associated with the media sharing session.

Figure 11:
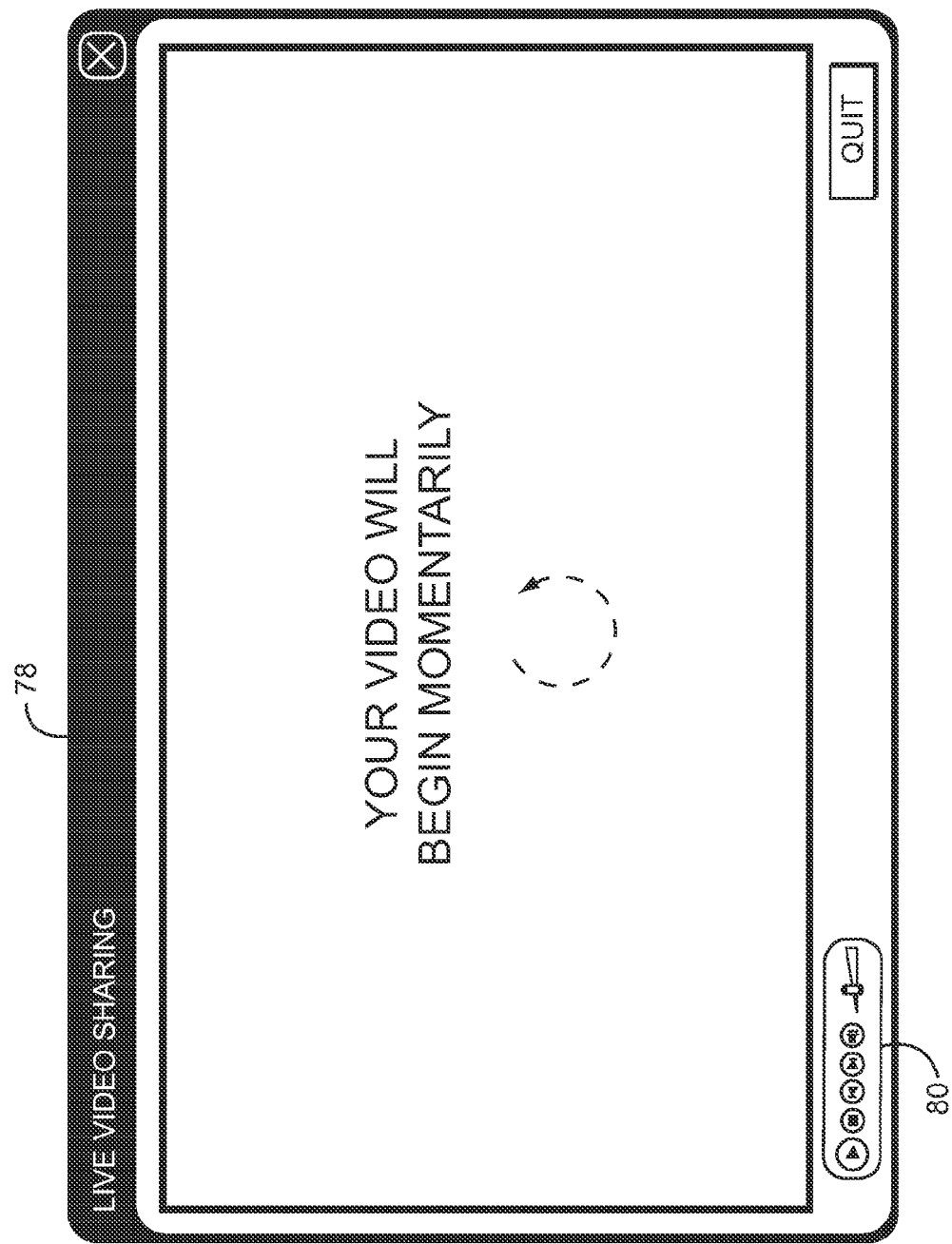
FIGS. 11 and 12 illustrate a playback page before and after media is streamed, respectively, according to one embodiment of the present invention.

Once the join session link 76 is selected, the personal computer 26 will send a join session request with the contact information that was provided in the contact field 74, to the MSS 22 (step 300). The MSS 22 will recognize the join session request as being associated with the media sharing session, and if necessary, access the session database 52 to identify information associated with the media sharing session. Accordingly, the MSS 22 will send an information query for the media sharing session to the session database 52 (step 302), which will access the media sharing session information for the media sharing session (step 304). The session database 52 will send the media sharing information back to the MSS 22 (step 306), which will process the media sharing session information and initially generate a playback page (step 308). The playback page may be configured to activate the media player provided by the personal computer 26, and provide information indicating that the media, and in particular the video in this example, will begin momentarily. The playback page is provided to the personal computer 26 (step 310) and displayed to User 2. The media player is activated and configured to buffer and display the streaming media via the playback page, once the streaming media becomes available. A playback page 78 is illustrated in FIG. 11. Notably, the playback page 78 may include a playback toolbar 80, which will be used to control playback of the streaming media of the media sharing session.

Meanwhile, the MSS 22 may initiate establishment of the associated communication session for the media sharing session, and in particular, take the necessary steps to connect User 2 into an existing communication session, establish a communication session between User 2 and other participants, or in this example, initiate an individual voice session between the mobile terminal 24 of User 2 and the conference bridge 32. The MSS 22 will initiate separate individual voice sessions between the POTS telephone 12 and the VoIP telephone 28 in association with users 1 and 3, respectively, as they join the media sharing session. In this example, the conference bridge 32 will effectively provide a conference session, which connects each of the individual voice sessions to allow each of the users 1, 2, and 3 to talk to one another via the conference session while the media sharing session is taking place.

To initiate the individual voice session between the mobile terminal 24 and the conference bridge 32, the MSS 22 may provide appropriate instructions for the call server 34 to set up a voice session between the conference bridge 32 and the mobile terminal 24 using the contact information provided in the join session request (step 312). When each of the participants establishes their respective individual voice sessions with the conference bridge 32, a conference communication session is provided amongst the various participants, to allow the participants to communicate with each other over a communication session that is separate from the media sharing session that may be established as described further below. If an access code and password is required to identify and join the conference session provided by the conference bridge 32, the MSS 22 may provide that information to the call server 34 with the instructions to set up the voice session. The call server 34 will then interact with the mobile terminal 24, or at least the appropriate call control entities in the PSTN 14 as well as the call server 34 (steps 314 and 316) to establish a bearer path between the mobile terminal 24 and the conference bridge 32 (step 318). The bearer path represents an individual voice session between the mobile terminal 24 and the conference bridge 32. Once the bearer path is established between the mobile terminal 24 and the conference bridge 32, the bearer path may be conferenced into the existing conference session in traditional fashion, wherein each of the parties to the conference session may communicate with each other in traditional conference fashion. Although the illustrated embodiment employs the conference bridge 32, the MSS 22 may instruct the call server 34 to establish point-to-point connections between any two participants.

The MSS 22 may use the identity of the participants, information about the selected media for the media sharing session, or any other information provided in light of the media sharing session to identify targeted advertisements to provide with the selected media during the media sharing session. Accordingly, the MSS 22 may provide an ad query to the ads database 48 (step 320), to obtain ad information that identifies advertisements to provide with the selected media during the media sharing session, and perhaps when to provide those advertisements during the media sharing session. The ads database 48 will retrieve the ad information for the media sharing session (step 322) and provide the ad information back to the MSS 22 (step 324). The MSS 22 will then provide instructions to the video server 20 to prepare the selected media and any identified advertisements based on the ad information for streaming to the participants in the media sharing session (step 326). The video server 20 will take the necessary steps to access the selected media and the advertisements based on the ad information. At this point, the video server 20 is prepared to provide streaming media to the personal computer 26 of User 2, wherein the streaming media represents the selected media and any advertisements identified in the ad information. The advertisements may be provided before, during, after, or over all or selected portions of the selected media. Insertion of the advertisements may depend on the actual media content. For real time media content, the advertisements may be inserted in defined time slots or used to replace existing advertisements in the media content. The advertisements may take various forms. For example, the advertisements provided in or with the selected media may take the form of text, animations, icons, and the like, as well as supplemental audio or video content. Those skilled in the art will recognize multiple techniques for providing advertisements in or with media content.

Figure 12:
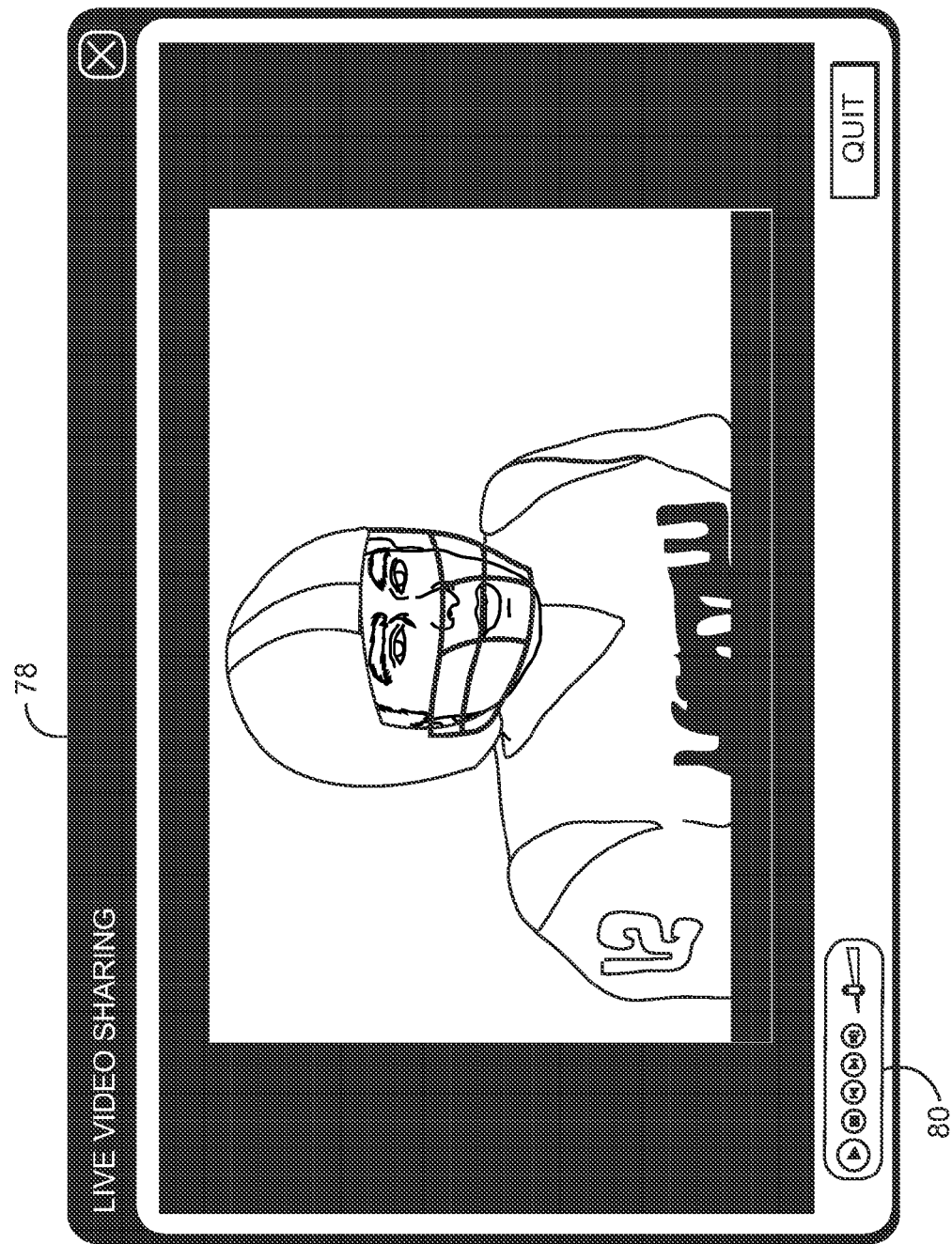

When the MSS 22 instructs the video server 20 to start streaming media for the media sharing session (step 328), the video server 20 will begin streaming media for the media sharing session to the personal computer 26 (step 330). The personal computer 26, and in particular the media player that is operating in association with the window displaying the playback page 78, will begin buffering the streaming media. If User 2 is the first participant to join the media sharing session, once sufficient media has been buffered, the media player may begin playback of the streaming media, automatically or in response to a corresponding playback control message that is provided by the MSS 22. In this example, the streaming media includes video content for a football program, which may be broken down into one or more program segments and any identified advertisements. Once playback begins, the video content may be presented in the playback page 78 as illustrated in FIG. 12.

Once the media sharing session and the associated communication session are established, the MSS 22 will coordinate and control the two sessions. Since the MSS 22 is capable of controlling the media sharing session, and in particular the streaming media provided for the media sharing session, extensive flexibility is provided. For example, the streaming media may be initiated upon a first participant joining or initiating the media sharing session, as soon as two or more participants have joined the media sharing session, once the host participant has joined the media sharing session, or once a participant provides an instruction to initiate or "play" the streaming media for the media sharing session. As will be described further below, the playback of the streaming media is synchronized among the various participants. Further, playback control, such as play, stop, pause, rewind, fast forward, and scrub for the streaming media may be provided to each of the participants by any one or a selected one of the participants. In other words, a playback control initiated by one participant will not only affect the streaming media provided to that participant, but will also control the streaming media provided to the other participants in the media sharing session. In essence, playback control commands selected by one participant are relayed to the MSS 22, which will forward instructions to the media players of the other participants in the media sharing session. In response to receiving these instructions, the media players will implement the desired playback control, such that the media streams to each of the participants are controlled in the same fashion. The MSS 22 will also take measures to monitor the portion of the streaming media that is being presented to the various participants, and will provide instructions to the corresponding media players to ensure that the streaming media is being displayed to the respective participants in a synchronized fashion. The video server 20 may deliver the streaming media to the respective media players in separate media streams or via a multicasting technique.

Figure 13:
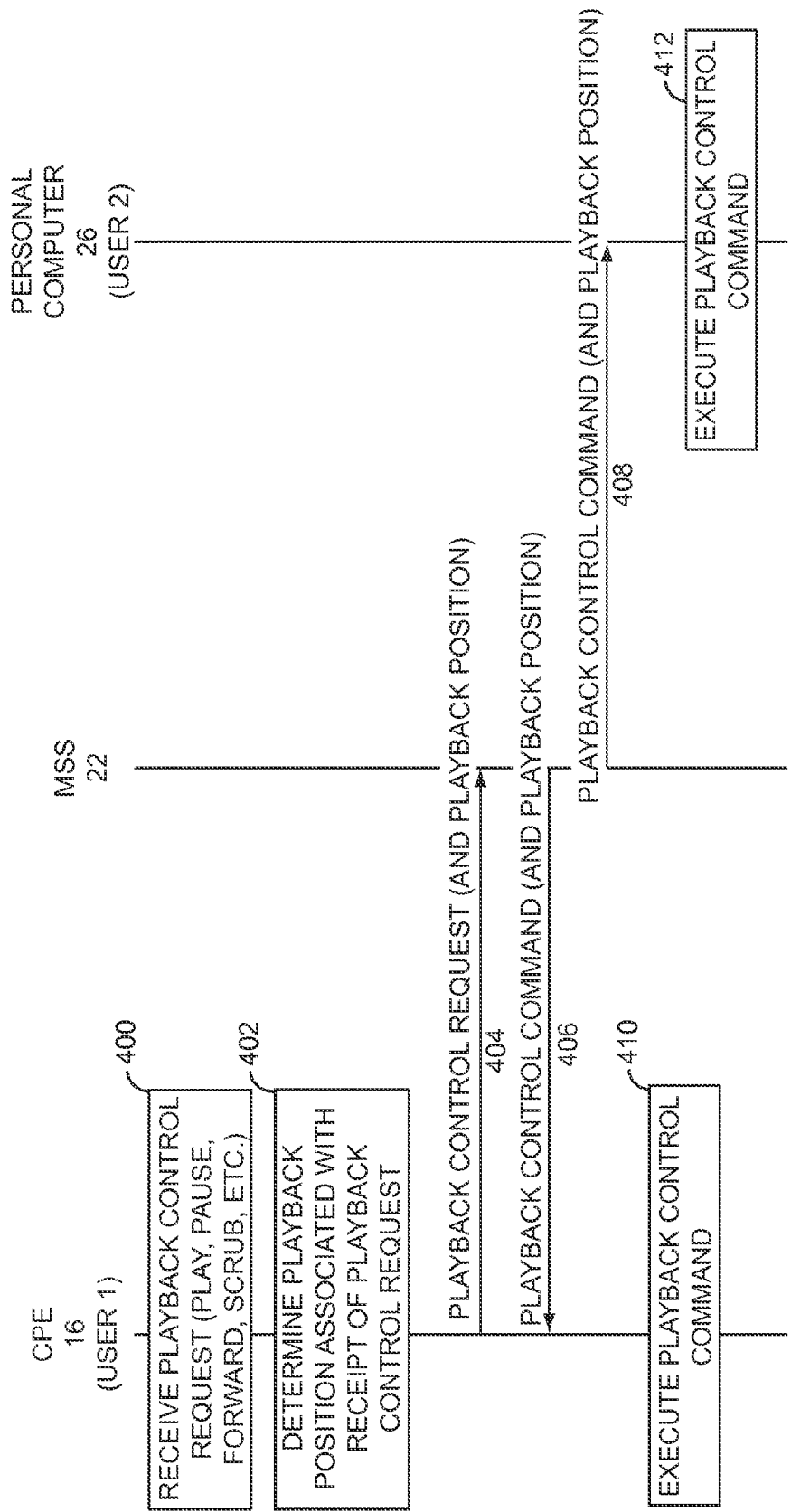
FIG. 13 provides a message flow illustrating an exemplary process for controlling a media sharing session according to one embodiment of the present invention.

With reference to the message flow of FIG. 13, an exemplary process for controlling playback of the various media players is illustrated according to one embodiment of the present invention. In general, each media player is configured to report playback control commands to the MSS 22, which will distribute the playback control commands to the other media players. For example, assume that User 1 and User 2 are participants in the media sharing session, and that the streaming media for the media sharing session is being presented to the CPE 16 of User 1 and the personal computer 26 of User 2. The media players or like functionality provided in the CPE 16 and personal computer 26 are each capable of recognizing playback control commands provided by the respective users 1 and 2, and presenting these playback control commands to the MSS 22. In addition, these devices are capable of determining the playback position, which is the location within the streaming media that is currently being presented to the user. Given various factors, such as network delay and processing capabilities of the respective media players, media streamed from the video server 20 may ultimately be displayed at different times by the respective media players. As such, it may be important for the various media players to be able to determine the playback position and report it to the MSS 22 in an effort to synchronize the playback of the streaming media at the various media players.

In this example, assume that media is being streamed to the media players of User 1 and User 2, and at some point, User 1 interacts with the playback toolbar 80 of the playback page 78 to select a playback control command. The media player of User 1 will receive the playback control request (step 400), and preferably determine the playback position within the streaming media when the playback control request was received (step 402). The media player of User 1 will immediately send a corresponding playback control request, and if available the playback position, to the MSS 22 (step 404). The MSS 22 will send the playback command to the media players of the participants in the media sharing session, including the media players for users 1 and 2 (steps 406 and 408). Upon receiving the playback control commands from the MSS 22, the media players for the respective participants will execute the playback control command in light of the playback position, if the playback position was available (steps 410 and 412). Notably, the media player at which a playback control command is initially received may execute the playback control command before sending the playback control command to the MSS 22. Further, the MSS 22 does not need to forward the playback control command back to the media player from which the original playback control command was received.

In an effort to maintain synchronization, the MSS 22 may process the playback position in light of the known playback positions of the various media players to help maintain synchronization. For example, if the playback position for the media player of User 1 lagged behind that of the media player for User 2, the MSS 22 may adjust the playback position for one or both of the media players before providing the playback control command to those media players. If the playback control command was a pause command, the MSS 22 may adjust the playback position provided back to the media player of User 1 such that the streaming media is paused at the same position for User 1 and User 2. In this example, the media player of User 2 may initiate the pause command a few milliseconds ahead of the media player of User 1, such that the media player of User 1 can effectively catch up with the media player of User 2 before pausing. As a result, not only is a playback command from one participant applied to the media streams of other participants, implementation of the playback command may be a vehicle for maintaining synchronization of the various media streams among the different participants.

Figure 14:
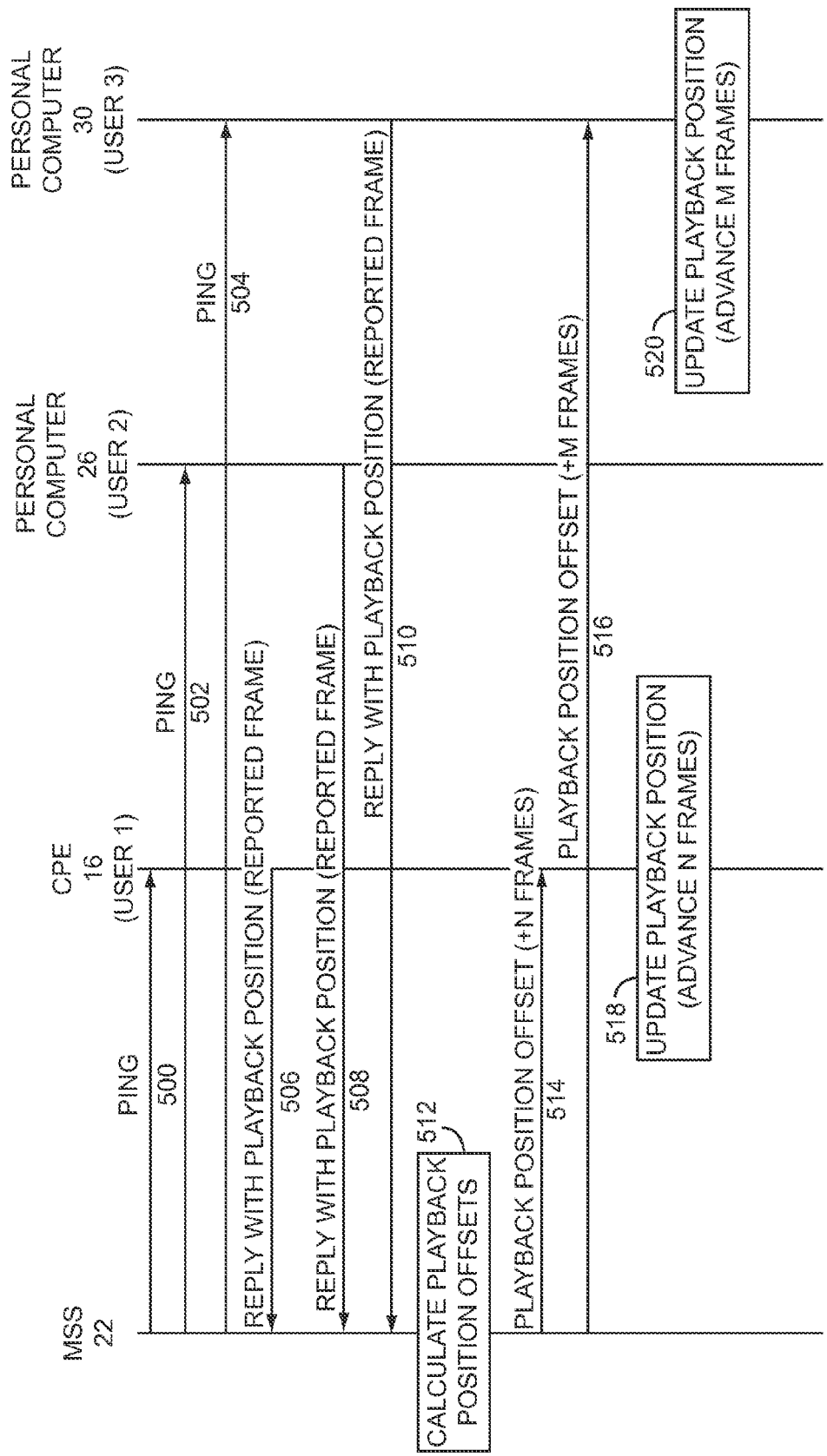
FIG. 14 provides a message flow illustrating an exemplary process for maintaining synchronization of a media sharing session according to one embodiment of the present invention.

With reference to FIG. 14, a messaging flow is provided to illustrate an additional technique for maintaining synchronization of the various media streams, and in particular the playback positions of the various media players involved in the media sharing session. On a systematic basis, the MSS 22 will send "ping" messages to the participating media players of the CPE 16, personal computer 26, and personal computer 30, assuming that users 1, 2, and 3 are the participants in the media sharing session (steps 500, 502 and 504). The ping messages are effectively heartbeat messages that are sent to the respective CPE 16, personal computer 26, and personal computer 30 to retrieve synchronization information from the respective media players. Based on the synchronization information, the MSS 22 will instruct the respective media players to adjust their playback positions in an effort to maintain synchronization of the playback positions among the various media players. In this example, each of the media players for the CPE 16, personal computer 26, and personal computer 30 will identify their playback position when the ping message is received, and provide a reply to the ping message that includes the playback position (steps 506, 508, and 510). As illustrated, the playback position identifies the frame of the video content that is reported as being displayed by the media player when the ping message is received. Notably, the time delay between sending a ping message and receiving a reply with the playback position for the different media players may differ from one media player to another. To determine the actual playback position at any given time for the respective media players, the MSS 22 may take into consideration such differences. Preferably, the MSS 22 will know the frame rate for the media stream and will be able to measure the round trip delay that is associated with sending the ping message and receiving the corresponding reply from each of the media players.

Assuming that the travel time from the MSS 22 to a media player is substantially the same as the travel time from the media player to the MSS 22, the current frame that is being displayed upon receipt of the reply could be calculated as follows:

$$\text{Current frame} = (\text{round trip delay} * \text{frame rate}/2) + \text{reported frame}$$

The current frame is calculated for each media player. Comparing the current frame for each of the media players in the media sharing session allows the MSS 22 to determine the relative playback positions for each of the media players with substantial accuracy. The media players whose playback positions lag behind the media player with the most advanced playback position are instructed to advance their playback positions. While the MSS 22 may instruct the lagging media players to jump ahead the exact number of frames necessary to fully synchronize with the leading media player, such jumps may be disruptive to the participants. As such, the MSS 22 may implement a number of incremental offsets that are implemented over a period of time to allow the lagging media players to gradually catch up to the leading media player.

As such, the MSS 22, based on the information derived from the respective playback positions reported by the media players, can calculate playback position offsets for the respective media players that are lagging behind one or more of the other media players in the media sharing session (step 512). For example, the MSS 22 may systematically calculate playback position offsets for the lagging media players that equate to roughly half the lag with respect to the leading media player. In this example, assume the media player of User 2 is the leading media player, and the media players of users 1 and 3 are lagging behind the media player of User 2. Further assume that the playback position information provided from the media players of users 1, 2, and 3 allow the MSS 22 to determine that the media player of User 2 is the leading media player and that the media players of users 1 and 3 should be advanced N frames and M frames, respectively. As such, the MSS 22 will send instructions to the media players for users 1 and 3 to provide playback position offsets of N and M frames, respectively (steps 514 and 516).

Accordingly, the media player of User 1 will receive the playback position offset instructions from the MSS 22 and update the playback position by advancing the playback position N frames (step 518). Similarly, the media player of User 3 will receive the update playback position instructions from the MSS 22 and update the playback position by advancing the playback position M frames (step 520). With this technique, the playback positions of the respective media players are substantially synchronized at any given time, even when the streaming media is played for substantial periods of time without pausing, stopping, scrubbing, and the like. By sending incremental advances over time, each media player that is lagging behind another media player is allowed to catch up with the leading media player in a relatively smooth progression. During this progression, the MSS 22 may avoid advancing the playback position of a given media player more than an amount that is deemed distracting or acceptable. To avoid unnecessary advancing of media players that are substantially synchronized, once a lagging media player is within a certain range, or number of frames, of the leading media player, the MSS 22 will not instruct the lagging media player to advance its playback position.

Figure 15:
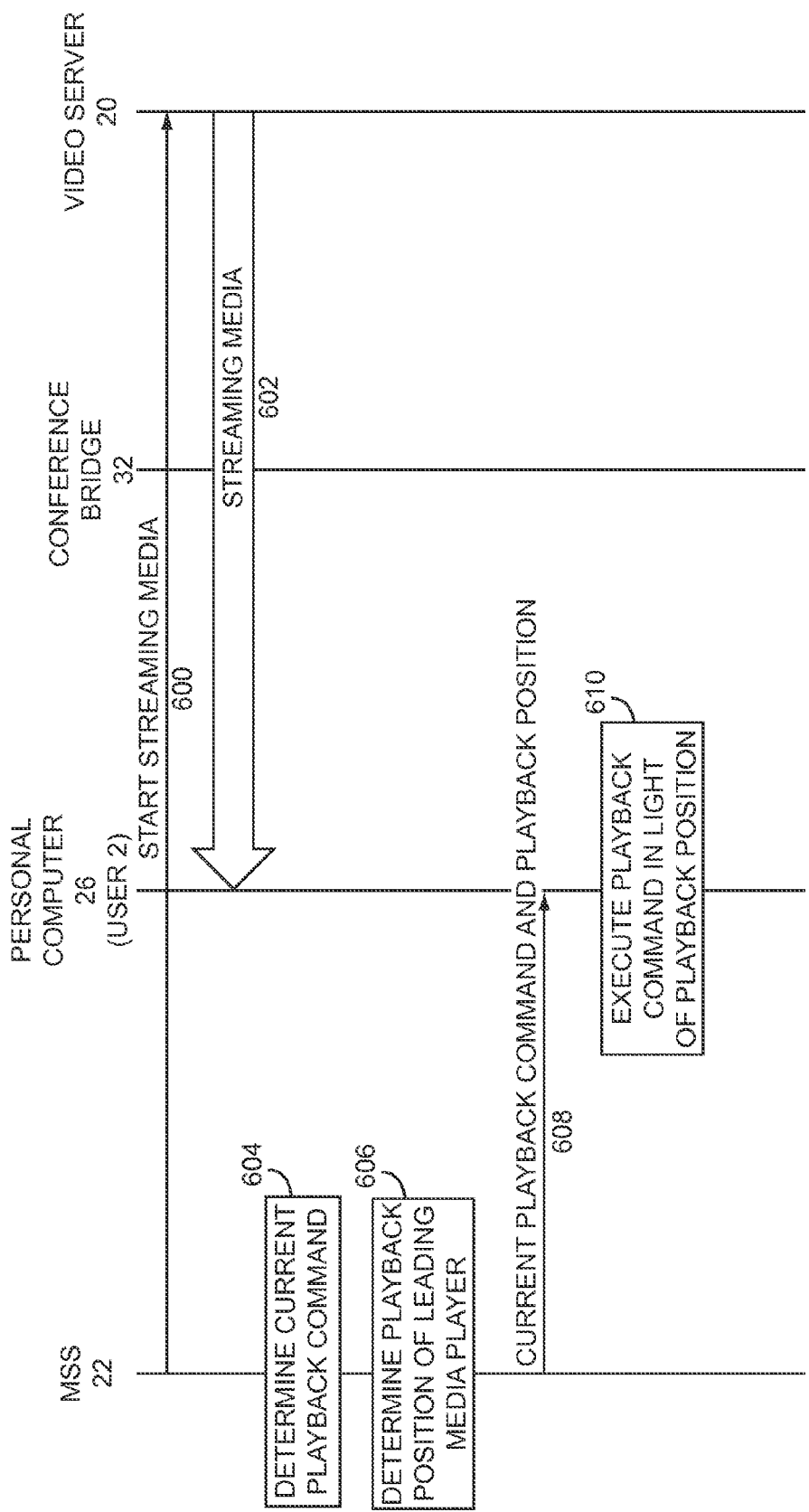
FIG. 15 provides a message flow illustrating an exemplary process for a late arrival joining a media sharing session according to one embodiment of the present invention.

In another embodiment of the present invention illustrated in FIG. 15, participants who join a media sharing session well after the media sharing session has started are allowed to join the media sharing session at the playback position of the other participants. The MSS 22 will preferably keep track of the current playback command and the playback position of the leading media player in the media sharing session, and provide this information to the media player of the late joining participant. In this example, assume that User 2 is the late joining participant and has requested the MSS 22 to join the media sharing session that is in progress. As described above, the MSS 22 may send an instruction to the video server 20 to start streaming media for the media sharing session (step 600). The video server 20 will begin sending the streaming media to the media player that is provided on the personal computer 26 of User 2 (step 602). The video server 20 may begin providing the selected media of the streaming media in progress or from the beginning. In either case, the personal computer 26 will begin buffering the streaming media and await a command from the MSS 22.

Meanwhile, the MSS 22 will determine the current playback command for the media sharing session (step 604) as well as identify the playback position of the media sharing session (step 606). In this example, the playback position for the media sharing session is the playback position of the streaming media at the leading media player. The current playback command and the playback position of the leading media player are readily available to the MSS 22 based on its concurrent monitoring of the various media players as described above. Once the current playback command and position are determined, the information is sent to the media player of User 2 (step 608), which will effectively execute the playback command in light of the playback position, such that the media player of User 2 effectively picks up in substantial synchronization with the leading media player (step 610). For example, if the leading media player is playing frame 10,312, the media player of User 2 will jump to frame 10,312 and begin presenting the streaming media to User 2. If the streaming media is currently paused at frame 15,619, the media player of User 2 will jump to frame 15,619, and present the media at frame 15,619 in a paused state. If User 2 or another participant selects play, all of the media players including the media player of User 2 will resume playback at frame 15,619 such that each of the media players is substantially synchronized during playback.

Figure 16:
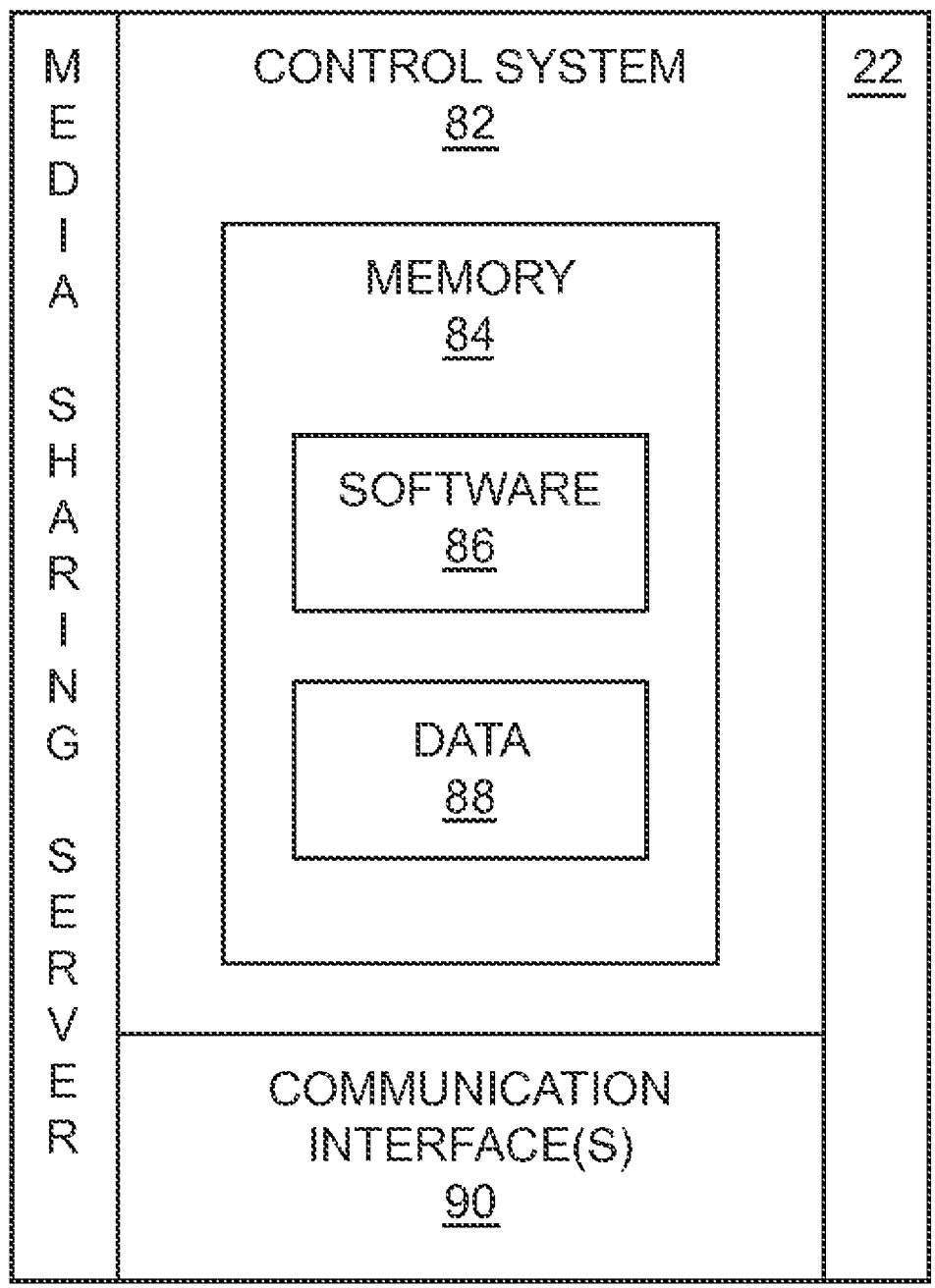
FIG. 16 is a block representation of a media sharing server according to one embodiment of the present invention.

With reference to FIG. 16, a block representation of the MSS 22 is illustrated. The MSS 22 may include a control system 82 that is associated with sufficient memory 84 for the requisite software 86 and data 88 to operate as described above. The control system 82 may be associated with one or more communication interfaces 90 to facilitate communications with the various entities illustrated in the communication environment 10 of FIG. 1.

As seen from the above example, a host participant may interact with the MSS 22 to create an invite by selecting media, such as video content, as well as selecting those users with which the host participant desires to share the media. Assuming the media is video content, the host participant may use various techniques to select the video content, such as directly specifying video content, searching listings to obtain the video content, identifying the video content from a program guide or playlist of the host participants, associates of the host participant, or other social networking list, and the like. The media may be provided from a recorded or streaming source of the host participant, any potential participants, an overall service provider, or the Internet. The video content may have advertising tags associated with it, wherein the tags are used to identify advertising slots in the content. These advertising slots may be filled with targeted advertising, which may be selected based on various criteria, including the media to be shared, the participants, and the like.

When selecting the participants, the host participant may directly enter the participants or select the participants from available contact lists or social networking groups. Selection of a participant may include a selection of a communication address to which an invite for the media sharing session may be sent. These addresses may include, but are not limited to, email addresses, instant messaging addresses, text or multimedia messaging addresses, Session Initiation Protocol (SIP) addresses, the addresses for customer premise equipment including set-top boxes and personal video recorders, and the like. Depending on the nature of the media sharing session, the invite may specify when the media sharing session should take place. Media sharing sessions may be impromptu and be initiated as soon as participants receive the invite and join the media sharing session, or may be planned with specific times and dates, which may represent a single media sharing instance or a recurring event. As indicated, the invite may include comments from the host and will include a unique URL that is assigned to the media sharing session and shared with the invited participants in the media sharing session. Once the invite information is provided to the MSS 22, the invite, including the URL, is provided to the identified participants, which in certain instances may forward these invites, including the URL, to other potential participants.

In the preferred embodiment, the media sharing session is associated with a separate communication session, which is established amongst the participants and allows the participants to communicate with each other in real time through various media, including voice, video, messaging, and the like. The MSS 22 will preferably control the initiation of the media sharing session by instructing the appropriate entity, such as the video server 20, to stream the selected media to the appropriate devices of the invited participants as well as the host participant automatically or in response to the participants joining the media sharing session. The MSS 22 may also initiate the communication session amongst the participants, either directly or through an appropriate conference coordination function, such as a messaging server 36, conference bridge 32, or the like.

To join the media sharing session and the communication session, a participant may select the URL associated with the media sharing session from their browser, which will provide a message to the MSS 22 to initiate the media sharing session, and perhaps the associated communication session. During this interaction with the MSS 22, the participant may provide a communication address that will be used for the communication session to the MSS 22. The MSS 22 will use that communication address to facilitate an appropriate communication session between the corresponding communication terminal of the participant and either communication terminals of the other participants or a central conferencing entity.

Once the media sharing session and the communication session are established, the MSS 22 may operate to control both sessions in a coordinated fashion. For voice communication sessions, the voice media for the communication session may be provided via any type of communication terminal or soft client provided on a computing device. As such, voice media for the communication session may be provided via the POTS telephone 12, mobile terminal 24, VoIP telephone 28, or a VoIP soft client provided on a personal digital assistant or personal computer, such as the personal computers 26, 30 of FIG. 1. Audio or video media may be provided via a browser that has an audio or video plug-in running on a personal digital assistant, personal computer 26, 30, or the like. As indicated above, these plug-ins effectively provide media player functionality, and are referred to as media players. Such media players may be provided by various CPEs 16, such as set-top boxes, digital video recorders, cable cards, and the like. Audio and video media may be provided in one direction toward the participants, or bi-directionally, wherein video of or from the participants is either provided in the media sharing session or in the associated communication session, depending on the desires of the participants and the configuration of the communication environment 10.

Preferably, playback and the control of playback for the media provided in the media sharing session are synchronized among the various participants. Such synchronization is provided by having the MSS 22 take the necessary steps to substantially synchronize the playback position of the media for each of the participants as well as instruct the various media players to implement playback controls that are being implemented by one of the participants in a unified fashion. With the present invention, the MSS 22 allows multiple users to share and control media in a synchronized manner. Given the ease with which a media sharing session may be organized and the ability to synchronize an ensuing media sharing session, participants are provided a high quality media sharing experience, wherein each participant, if desired, may control the overall media sharing session.

Those skilled in the art will recognize improvements and modifications to the embodiments of the present invention. All such improvements and modifications are considered within the scope of the concepts disclosed herein and the claims that follow.

What is claimed is:

1. A method for facilitating media sharing comprising:
   generating a uniform resource locator (URL) for a media sharing session in which selected media is to be shared by a plurality of participants;
   providing the URL to the plurality of participants;
   for each of the plurality of media participants;
      determining that the URL was selected by one of the plurality of participants; and
      after determining that the URL was selected, effecting delivery of the selected media to a corresponding media terminal, wherein the selected media is delivered to media terminals of the plurality of participants to provide the media sharing session;
   interacting with the media terminals for initiating playback control and presentation of the selected media by the media terminals to the plurality of participants during the media sharing session;
   systematically calculating and comparing a current frame of the selected media displayed at each of the media terminals to determine a leading playback position of a leading media terminal, the current frame at least partially determined by a round trip delay associated with sending a message to each of the media terminals; and
   incrementally offsetting a playback position of at least one media terminal to substantially synchronize presentation of the selected media with the leading playback position.

2. The method of claim 1 further comprising:
   receiving invite information that identifies the selected media and is indicative of the plurality of participants for the media sharing session; and
   generating an electronic invite for the media sharing session comprising the URL and information bearing on the media sharing session,
   wherein providing the URL to the plurality of participants comprises sending the electronic invite to the plurality of participants.

3. The method of claim 2 wherein a portion of the invite information that is indicative of the plurality of participants comprises communication addresses associated with the plurality of participants, and the electronic invite is sent to the plurality of participants using the communication addresses.

4. The method of claim 2 wherein the invite information is received from one of the plurality of participants.

5. The method of claim 2 wherein the information bearing on the media sharing session identifies the selected media and the plurality of participants for the media sharing session.

6. The method of claim 5 wherein the invite information further comprises a time or date for the media sharing session and the information bearing on the media sharing session identifies the time or date associated with the media sharing session.

7. The method of claim 2 wherein the invite information further comprises comments provided by an organizer of the media sharing session and the information bearing on the media sharing session comprises the comments.

8. The method of claim 1 wherein the selected media is streamed to the media terminals.

9. The method of claim 8 wherein advertising content is selected and streamed with the selected media to the media terminals.

10. The method of claim 9 wherein at least a portion of the advertising content is selected based on the at least one of the plurality of participants.

11. The method of claim 9 wherein at least a portion of the advertising content is selected based on the at least one of the selected media.

12. The method of claim 8 wherein the selected media comprises program content for a plurality of programs.

13. The method of claim 8 wherein the selected media comprises one of audio and video content.

14. The method of claim 1 further comprising in association with the media sharing session, effecting establishment of a communication session sufficient to allow the plurality of participants to communicate with one another in real time while the media sharing session is in progress.

15. The method of claim 14 wherein the communication session is a messaging session that allows the plurality of participants to exchange messages in real time during the media sharing session.

16. The method of claim 14 further comprising retrieving a communication address from at least one of the plurality of participants and using the communication address to effect establishment of at least a portion of the communication session.

17. The method of claim 14 wherein the communication session is a voice session.

18. The method of claim 17 wherein the communication session is conference session, which is supported by a conference bridge that effectively conferences individual voice sessions with the plurality of participants.

19. The method of claim 1 wherein the select media is delivered to media player functions of the media terminals such that each media player function presents the selected media to a corresponding one of the plurality of participants, and interacting with the media terminals for initiation playback control and presentation of the selected media comprises:
   receiving a first message indicative of a first participant of the plurality of participants selecting a playback control instruction intended to affect playback of the selected media at the media player function of the first participant in a first manner; and
   providing a second message to the media player function of any other participant of the plurality of participants, the second message comprising an instruction to implement the playback control instruction such that playback of the selected media at the media player function of the any other participant is affected in the first manner.

20. The method of claim 19 further comprising providing the second message to the media player function of the first participant, wherein the media player function of the first participant is responsive to the playback control instruction.

21. The method of claim 19 wherein the first message further comprises playback position information indicative of the playback position in the selected media at which the playback control instruction was selected, the second message comprises position information relating to the playback position, and the media player function of the any other participant will implement the playback control instruction in light of the position information to substantially synchronize playback of the selected media to the plurality of participants.

22. The method of claim 1 wherein the select media is delivered to media player functions of the media terminals such that each media player function presents the selected media to a corresponding one of the plurality of participants, and wherein systematically calculating and comparing the current frame of the selected media displayed at each of the media terminals comprises:
   receiving playback position information bearing on the playback position in the selected media from each of the plurality of media player functions;
   generating adjustment information for at least one of the plurality of media player functions based on the playback position information received from the plurality of media player functions, the adjustment information configured to cause the media player function of the at least one of the plurality of participants to adjust the playback position of the selected media stream in an effort to substantially synchronize playback of the selected media to the plurality of participants; and
   providing a first message comprising the adjustment information to the media player function of the at least one of the plurality of participants.

23. The method of claim 22 wherein further comprising:
   receiving a second message indicative of a first participant of the plurality of participants selecting a playback control instruction intended to affect playback of the selected media at the media player function of the first participant in a first manner; and
   providing a third message to the media player function of any other participant of the plurality of participants, the third message comprising an instruction to implement the playback control instruction such that playback of the selected media at the media player function of the any other participant is affected in the first manner.

24. The method of claim 1 further comprising obtaining media from media sources selected from the group consisting of internet protocol television (IPTV), satellite, broadcast media, and video repository sources.

25. A media sharing system comprising:
   At least one communication interface; and
   A control system associated with the at least one communication interface and adapted to:
      generate a uniform resource locator (URL) for a media sharing session in which selected media is to be shared by a plurality of participants;
      provide the URL to the plurality of participants;
      for each of the plurality of participants:
         determine that the URL was selected by one of the plurality of participants; and
         after determining that the URL was selected, effect delivery of the selected media to a corresponding media terminal, wherein the selected media is delivered to media terminals of the plurality of participants to provide the media sharing session;
      interact with the media terminals to initiate playback control and presentation of the selected media by the media terminals to the plurality of participants during the media sharing session
      systematically calculate and compare a current frame of the selected media displayed at each of the media terminals to determine a leading playback position of a leading media terminal, the current frame at least partially determined by a round trip delay associated with sending a message to at least one of the media terminals; and
      incrementally offset a playback position of at least one media terminal to substantially synchronize presentation of the selected media with the leading playback position.

26. The media sharing system of claim 25 wherein the control system is further adapted to:
   receive invite information that identifies the selected media and is indicative of the plurality of participants for the media sharing session; and
   generate an electronic invite for the media sharing session comprising the URL and information bearing on the media sharing session,
wherein the URL is provided to the plurality of participants in the electronic invite that is delivered to the plurality of participants.

27. The media sharing system of claim 25 wherein the select media is delivered to media player functions of the media terminals such that each media player function presents the selected media to a corresponding one of the plurality of participants, and wherein to interact with the media terminals to initiate playback control and presentation of the selected media, the control system is further adapted to:
   receive a first message indicative of a first participant of the plurality of participants selecting a playback control instruction intended to affect playback of the selected media at the media player function of the first participant in a first manner; and provide a second message to the media player function of any other participant of the plurality of participants, the second message comprising an instruction to implement the playback control instruction such that playback of the selected media at the media player function of the any other participant is affected in the first manner.

28. The media sharing system of claim 27 wherein the control system is further adapted to provide the second message to the media player function of the first participant, wherein the media player function of the first participant is responsive to the playback control instruction.

29. The media sharing system of claim 27 wherein the first message further comprises playback position information indicative of a playback position in the selected media at which the playback control instruction was selected, the second message comprises position information relating to the playback position, and the media player function of the any other participant will implement the playback control instruction in light of the position information to substantially synchronize playback of the selected media to the plurality of participants.

30. The media sharing system of claim 25 wherein the selected media is delivered to media player functions of the media terminals such that each media player function presents the selected media to a corresponding one of the plurality of participants, and wherein to interact with the media terminals to initiate playback control and presentation of the selected media, the control system is further adapted to, on a systematic basis:

receive playback position information bearing on the playback position in the selected media from each of the plurality of media player functions;

generate adjustment information for at least one of the plurality of media player functions based on the playback position information received from the plurality of media player functions, the adjustment information configured to cause the media player function of the at least one of the plurality of participants to adjust the playback position of the selected media stream in an effort to substantially synchronize playback of the selected media to the plurality of participants; and provide a first message comprising the adjustment information to the media player function of the at least one of the plurality of participants.

31. The media sharing system of claim 25 wherein the control system is further adapted to effect establishment of a communication session sufficient to allow the plurality of participants to communicate with one another in real time while the media sharing session is in progress.

32. The media sharing system of claim 25 wherein the selected media is obtained from media sources selected from the group consisting of internet protocol television (IPTV), satellite, broadcast media and video repository sources.

\* \* \* \* \*